United States Patent
Damick et al.

(10) Patent No.: US 7,325,667 B1
(45) Date of Patent: Feb. 5, 2008

(54) SYSTEMS AND METHODS FOR FEEDING ARTICLES TO AND REMOVING ARTICLES FROM AN AUTOMATIC WASHER

(76) Inventors: Keith D. Damick, 57 Dublin Heights Rd., Penfield, NY (US) 14526; Bruce K. Ginder, 39 Carriage Ct., Pittsford, NY (US) 14534; Lowell A. Onderdonk, 2462 Freshour Rd., Canandaigua, NY (US) 14424; Edward J. Horeth, 125 Wildmere Rd., Rochester, NY (US) 14617

( * ) Notice: Subject to any disclaimer, the term of this patent is extended or adjusted under 35 U.S.C. 154(b) by 384 days.

(21) Appl. No.: 10/962,123

(22) Filed: Oct. 8, 2004
(Under 37 CFR 1.47)

Related U.S. Application Data

(60) Provisional application No. 60/510,176, filed on Oct. 10, 2003.

(51) Int. Cl.
*B65G 43/08* (2006.01)
(52) U.S. Cl. ............. 198/395; 198/401; 198/502.3
(58) Field of Classification Search ............. 198/395, 198/401, 502.3
See application file for complete search history.

(56) References Cited

U.S. PATENT DOCUMENTS

| | | | | |
|---|---|---|---|---|
| 3,888,362 A | * | 6/1975 | Fletcher et al. | 414/620 |
| 3,986,007 A | * | 10/1976 | Ruoff, Jr. | 700/251 |
| 4,146,924 A | * | 3/1979 | Birk et al. | 700/259 |
| 4,412,293 A | * | 10/1983 | Kelley et al. | 700/259 |
| 4,634,328 A | * | 1/1987 | Carrell | 198/444 |
| 4,670,974 A | * | 6/1987 | Antoszewski et al. | 29/701 |
| 5,855,104 A | * | 1/1999 | Schlagel et al. | 53/54 |
| 6,278,906 B1 | * | 8/2001 | Piepmeier et al. | 700/250 |
| 6,804,880 B2 | * | 10/2004 | Yamamoto | 29/700 |
| 6,818,543 B2 | * | 11/2004 | Bendat et al. | 438/613 |
| 7,017,623 B2 | * | 3/2006 | Tribble et al. | 141/27 |
| 7,028,829 B2 | * | 4/2006 | Buchi | 198/444 |

OTHER PUBLICATIONS

"Presentation to Memorial-Sloan Kettering Cancer Center," Mack Design, Inc., Aug. 6, 2002 (41 pages).
"Presentation to Getinge/Castle," Mack Design, Inc., Sep. 12, 2002 (44 pages).
"Presentation to Harvard Medical School" (Mis-Titled "Presentation to Memorial-Sloan Kettering Cancer Center"), Mack Design, Inc., Sep. 27, 2002 (49 pages).

* cited by examiner

*Primary Examiner*—Douglas A Hess
(74) *Attorney, Agent, or Firm*—Heslin Rothenberg Farley & Mesiti P.C.; John Pietrangelo

(57) ABSTRACT

Systems, methods, and devices for feeding articles to and removing articles from an automatic washer, for example, a tunnel-type automatic washer are provided. The systems and methods employ conveyors, for example, belt conveyors, gantry-type conveyors, and shuttle-type conveyors, for handling and conveying articles to or from a washer or an intermediate station. The conveyors utilize arm-end tooling adapted to grasp and manipulate at least one article, but may typically handle a plurality of articles. The arm-end tooling includes cylinder-based actuators that can be operated and controlled by an automated control system. The handling of the articles can be assisted by using a vision-based system. Aspects of the invention are suited for use in handling laboratory equipment, for example, utensils and containers, such as, laboratory animal cages, in particular, cage tops and cage bottoms.

15 Claims, 15 Drawing Sheets

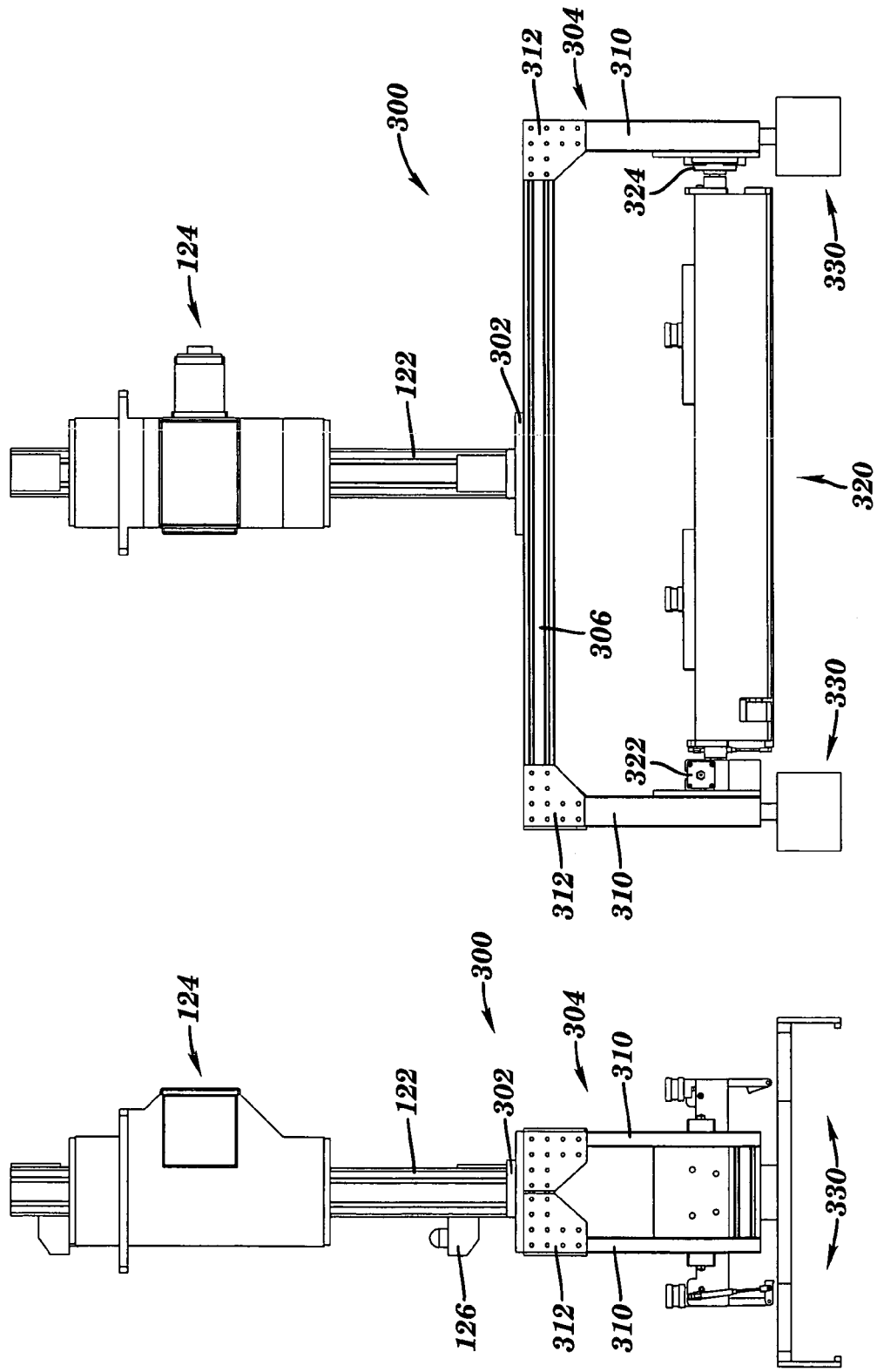

SYSTEMS AND METHODS FOR FEEDING ARTICLES TO AND REMOVING ARTICLES FROM AN AUTOMATIC WASHER

CROSS REFERENCE TO RELATED APPLICATIONS

This application claims priority from pending provisional application 60/510,176 filed on Oct. 10, 2003, the disclosure of which is hereby incorporated herein in its entirety.

FIELD OF THE INVENTION

This invention relates, generally, to systems, methods, and devices for feeding articles to and discharging articles from automated washers, and, more particularly, systems, methods, and devices for employing gantry-type conveyors for feeding laboratory articles to and discharging laboratory articles from tunnel-type automated washers.

BACKGROUND OF THE INVENTION

In laboratories, hospitals, medical schools, and other biological or medical research facilities, cleanliness and sterility of laboratory equipment is paramount. Due to the volume of equipment that must be washed and sterilization, for example, laboratory utensils and containers and the like, washing and sterilization is typically carried out in large commercial automatic washers, for example, tunnel-type washers where unwashed articles are introduced at one end of the washer and washed articles are discharged at the other end of the washer. However, the loading and unloading of such devices can be time-consuming and labor intensive, requiring staffing and continuous repetitive motion by the staff. Such staffing and their repetitive loading and unloading of conventional washers is costly, time consuming, and also prone to injury. There is a need in the art to reduce the amount of staffing, to reduce the potential for injury, reduce the cost of washing equipment, and generally increase the productivity of such equipment washing facilities.

One prior art means of addressing this need is by the use of traditional robots, that is, multi-axis robots that can grasp unwashed equipment and transport it to the washer. However, conventional robots are limited in how fast the equipment can be moved, have limited weight capacity, limited throughput, and also typically provide excessive positioning accuracy than is required for introducing equipment to automatic washers. For example, a stationary, pivoting robot is typically limited to how quickly it can pick, transport, and place a piece of equipment. Aspects of the present invention, overcome the limitations of traditional robots in this application.

Aspects of the present invention, address many of the needs of the prior art systems by providing equipment handling systems for quickly, efficiently, and cost-effectively loading and unloading automatic washers.

SUMMARY OF THE INVENTION

The present invention employs gantry-type conveyors and/or shuttle-type conveyors to load and unload equipment for automatic washers, for example, tunnel-type washers. In contrast to a conventional robot, a gantry-type and shuttle-type conveyors comprises one or more automated linear conveyors that translate one or more arm-end tools for handling the equipment to be conveyed, for example, one or more gripping tools. Unlike conventional robots, gantry and shuttle conveyors can rapidly and accurately move equipment from one location to another desired location.

One aspect of the invention is a handling system for introducing articles to a washer, the handling system comprising: a loading station for introducing the articles to the handling system; a first conveyor for transferring the articles from the loading station to a first position; and a second conveyor for conveying the articles from the first position to the washer. In one aspect, the second conveyor may comprise a gantry-type conveyor or a shuttle-type conveyor.

Another aspect of the invention is a method of handling and feeding at least one article to a washer, the method comprising: providing at least one article; mounting the at least one article on a conveyor in a first position; conveying the at least one article from the first position to a second position; grasping at least one article with a conveyor; and conveying the at least one article from the second position to the washer using the gantry conveyor.

Another aspect of the invention is a handling system for removing articles from a washer, the handling system comprising: a first conveyor for conveying the articles from the washer to a first position; a second conveyor for conveying articles from the first position to a second position; and a third conveyor for transferring the articles from the second position to a third position.

A further aspect of the invention is a method for removing at least one article from a washer having a discharge position, the method comprising: conveying the at least one article from the discharge position to a first position; conveying the at least one article from the first position to a second position; and conveying the at least one article from the second position to a third position, for example, using a gantry-type or shuttle-type conveyor.

Another aspect of the invention is an arm-end tool for grasping a at least one article, typically, a plurality of articles, the arm-end tool comprising: a frame mountable on a conveyor; an open rectangular housing pivotably mounted to the frame; and means for gripping the plurality of articles mounted to the open rectangular housing.

Another aspect of the invention is a method of transferring at least one, typically, a plurality of articles from a first location to a second location using an arm-end tool comprising: a frame mountable on a conveyor; an open rectangular housing pivotably mounted to the frame; and means for gripping the at least one article mounted to the open rectangular housing, the method comprising: positioning the at least one article in the first location; locating the open rectangular housing around the at least one article; gripping the at least one article with the means for gripping; and conveying the gripped at least one article from the first position to the second position.

A still further aspect of the invention is an automated conveyor system for transferring articles from a first position to a second position, the system comprising: a conveyor having at least one beam; an arm-end tool mounted for translation along the at least one beam, the arm-end tool having at least one set of opposing gripping arms; a vision-based locating device; and an automated controller for controlling the operation of the conveyor and the operation of the arm-end tool in response to the vision-based locating device to locate the articles in the first position and transfer the articles from the first position to the second position.

Another aspect of the invention is an automated method of transferring at least one article from a first position to a second position, the method comprising: locating the at least one article in the first position using a vision-based system; in response to instructions from the vision-based system, positioning an arm-end tool having a gripping assembly adjacent the at least one article, the arm end tool mounted to a conveyor; actuating the gripping assembly to grasp the at least one article; transferring the at least one article from the first position to the second position by means of the conveyor.

Details of these aspects of the invention, as well as further aspects of the invention, will become more readily apparent upon review of the following drawings and the accompanying claims.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

FIG. 5 is a right-hand elevational view of the arm-end tool shown in FIG. 4.

FIG. 6 is a front elevational view of the arm-end tool shown in FIG. 4.

DETAILED DESCRIPTION OF FIGURES

The details and scope of the aspects of the present invention can best be understood upon review of the attached figures and their following descriptions.

Figure 1:
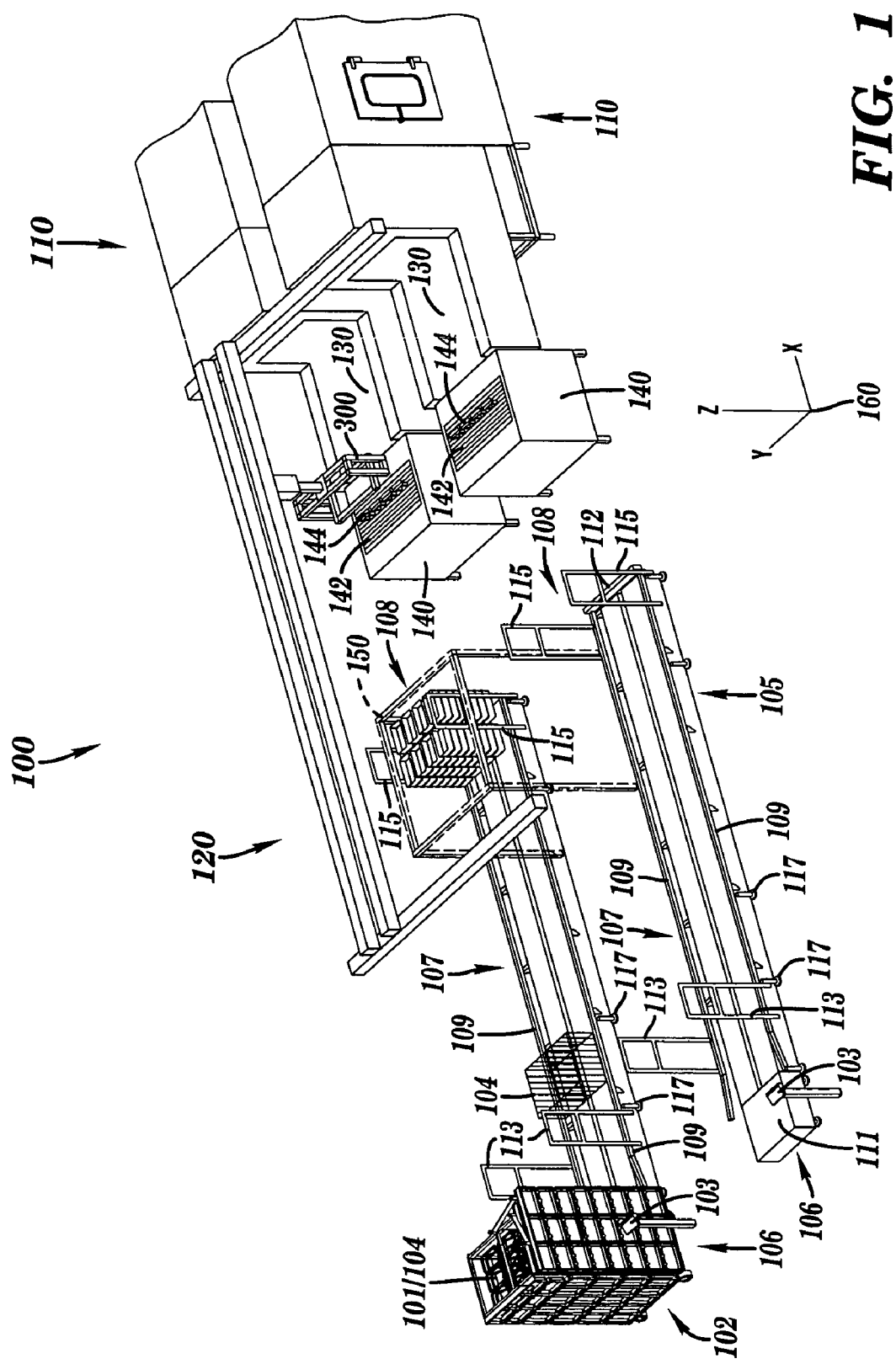
FIG. 1 is a left-hand perspective view of a handling system for feeding articles to an automatic washer according to one aspect of the invention.
Figure 2:
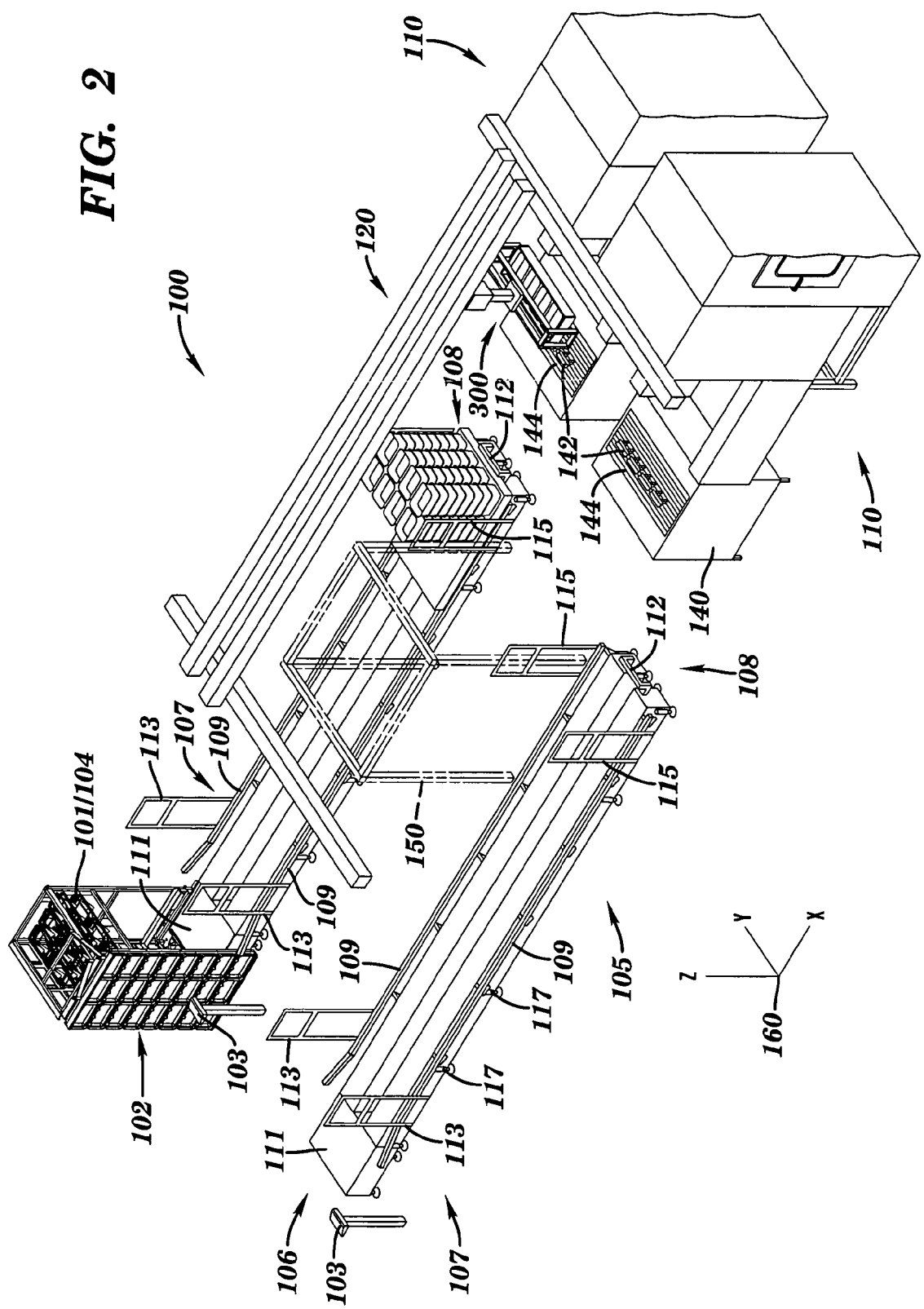
FIG. 2 is a right-hand perspective view of the handling system shown in FIG. 1.
Figure 3:
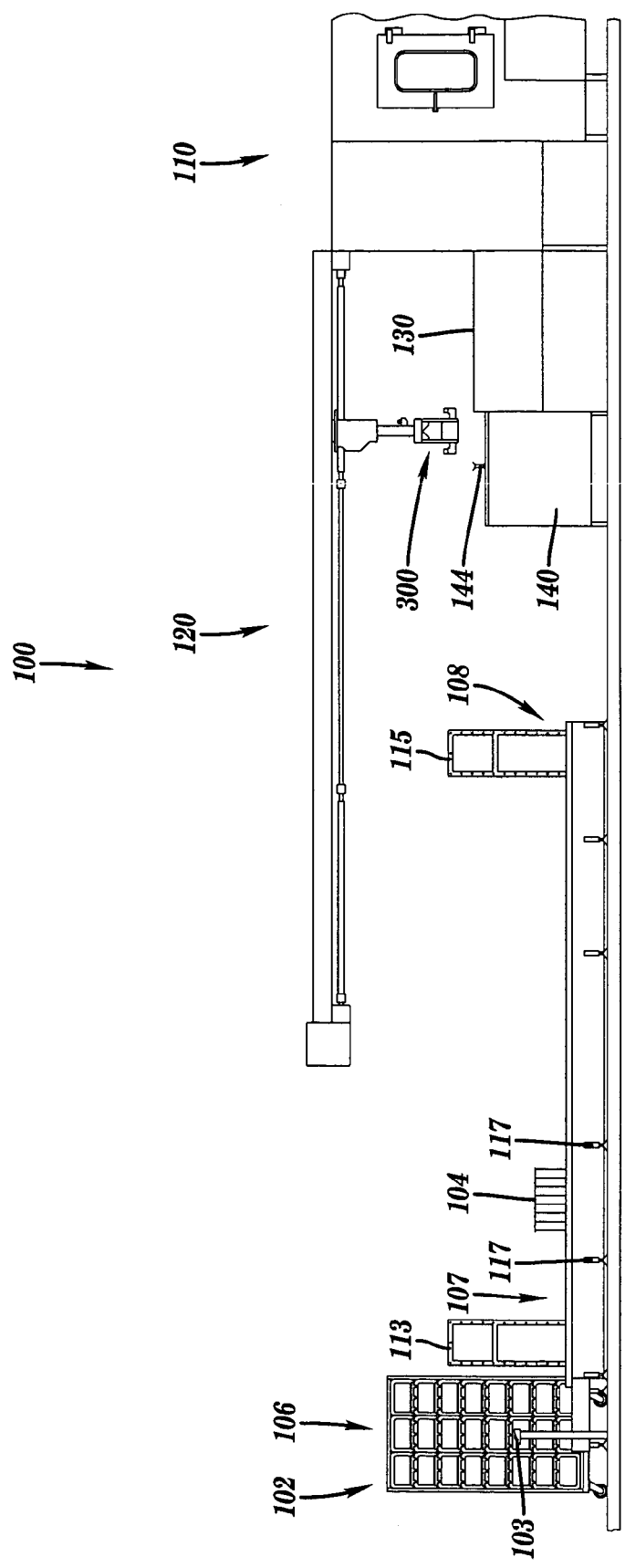
FIG. 3 is a side elevation view of the handling system shown in FIGS. 1 and 2.

FIG. 1 is a left-hand perspective view of a handling system 100 according to one aspect of the present invention. FIG. 2 is a right-hand perspective view of handling system 100 shown in FIG. 1. FIG. 3 is a front elevation view of handling system 100 shown in FIGS. 1 and 2. Handling system 100 includes a feeding system 105 that introduces articles 101 or containers 104 to an automatic washer 110. Handling system 100 is marketing under the name Mack Animal Cage Handling (MACH) System by Mack Design, Inc. of West Henrietta, N.Y., for example, the MACH 300 Series or MACH 350 Series system.

Washer 110 may be any type of conventional washer system, for example, a tunnel-type washer. In one aspect of the invention, washer 110 may be an indexing-type tunnel washer. In another aspect of the invention, washer 110 may be a continuous-flow tunnel washer, for example, a MTP 3236 tunnel washer provided by Getinge Inc. of Rochester, N.Y., though other types of washers may be used with aspects of the present invention.

The aspect of the invention shown in FIGS. 1, 2 and 3 is a dual-line system having two feed lines feeding two washers 110. However, aspects of the present invention may comprise one or more lines for handling and washing. For example, in one aspect of the invention, a single feed conveyor (107, discussed below) may also feed two or more washers 110. In another aspect of the invention, two or more feed conveyors 107 may feed one or more washers 110.

In addition, as will be recognized by those familiar with the materials handling art, aspects of the present invention may also used to handle articles for processing other than washing. For example, aspects of the present invention shown in FIGS. 1, 2, and 3, and throughout this Specification, may be used to handle and introduce articles for many types of processing or material handling, including inventory control and retrieval, food processing, machining, fabrication, and assembly facilities, and sorting, orienting, and stacking facilities, among many others.

According to one aspect of the invention, system 100 may be manually operated, for example, by an operator, or automatically operated, for example, by means of an automated controller having sensors to detect the nature, presence, and/or quantity of articles 101 or containers 104; actuators to engage, detect, and/or manipulate items 101 or containers 104; and controllers to control the operation of the components, actuators, and sensors of system 100. In one aspect of the invention, the control and operation of system 100 may be effected by means of a main control panel (not shown).

The types of articles 101 or containers 104 that may be handled and washed by system 100, and any of the systems described herein, are numerous. In one aspect of the invention, articles 101 that may be handled and washed are those that may be found in a laboratory, for example, containers, trays, utensils, bottles, jars, tools, pallets, and cages, for example, mouse, rat, or rabbit cages, and the like. In another aspect of the invention, articles 101 handled and washed in system 100 are those articles associated with laboratories which handle living specimens, for example, mice and rats, and may include animal cages and animal cage components, for example, cage bottoms, cage tops, feeding bottles, bottle caps, and the like. In one aspect of the invention, articles 101 that can be handled and washed in system 100 include the animal cages and cage components disclosed in U.S. Pat. No. 5,894,816 of Allentown Caging Equipment Co., Inc. of Allentown, N.J. (the disclosure of which is incorporated by reference herein), or their equivalent. According to another aspect of the invention, articles 101 handled and washed in system 100 may be containers 104 used to collect, transport, or store laboratory equipment, for example, storage containers, trays, or pallets, for example, pallets used to transport articles 101 to and from system 100. Articles 101 or containers 104 may be introduced to system 100 manually, for example, placed or located by an operator, or automatically, for example, by means of an automated robotic or gantry crane.

As shown in FIGS. 1, 2, and 3, articles 101 may be introduced to system 100 by means of a cart 102. Cart 102 may comprise any cart that is suitable for transporting articles 101, such as cages or bottles, to system 100. In one aspect of the invention, cart 102 transports at least one article 101 to system 100. In another aspect of the invention, cart 102 transports a plurality of articles 101 to system 100. As shown in FIGS. 1, 2, and 3, articles 101 transported by cart 102 may be provided or mounted in containers 104, for example, on a pallet, tray, box, or similar container. In one aspect of the invention, articles 101 may be transported to system 100 by means of a UniMac™ material handling cart as disclosed in co-pending U.S. application Ser. No. 10/071,323 filed on Feb. 8, 2002 and assigned to Getinge Inc. of Rochester, N.Y. (the disclosure of which is included by reference herein).

According to one aspect of the present invention, feeding system 105 includes infeed conveyors 107, for example, belt conveyors, for transferring articles 101 to be washed from a first position, or loading position, 106 to a second position, or "pick position", 108. In the aspect of the invention shown in FIGS. 1, 2, and 3, conveyors 107 are MACH CONV 450 conveyors provided by Mack Design Inc., though other types of conveyors may be used. Conveyors 107 may include a single belt or a plurality of belts, for example, two belts as shown in FIGS. 1 and 2.

According to one aspect of the invention, the loading position 106 may include sensors that, among other things, detect the presence of cart 102, the type of cart 102, and the contents of cart 102. The sensors located in loading position 106 may be located on one or more sensor support structures 113, for example, a structure referred to in the art as a "sensor tree". Sensor support structures 113 may include one or more sensors, for example, optical or electro-magnetic sensors, adapted or programmed to determine, for example, that bottles are being introduced to system 100 or that cage bottoms are being introduced to system 100, and accordingly vary the handling procedure. In one aspect of the invention, two sensor support structures 113 containing electro/mechanical actuators positioned opposite each other on either side of loading position 106 may be provided. In this aspect of the invention, at least one electro-mechanical actuator may interface with a physical feature set, for example, a recess or projection, on cart 102, for example, a UniMac cart discussed above.

The physical feature set on cart 102 may vary as a function of the articles 101 being transported by cart 102. For example, one physical feature set may correspond to a cart transporting cage bottoms; another physical feature set may correspond to a cart transporting bottles. In one aspect of the invention, the physical feature set on cart 102 may engage, for example, depress, an actuator. In response, the electro-mechanical actuator may then advise the main control system (not shown) that articles 101 or containers 104 are positioned to commence actuation or operation of system 100. In another aspect of the invention, the physical feature set on cart 102 may comprise one or more holes or one or more solid surfaces which interact with at least one optical sensor positioned adjacent the holes or surfaces. For example, in one aspect of the invention, a cage bottom pallet may be detached by two vertically spaced optical sensors adapted to detect a hole adjacent the upper sensor and a solid surface (that is, a blocked hole) adjacent the lower sensor on cart 102. Similarly, the presence of one or more bottle baskets on cart 102 may be indicated by a solid surface adjacent the upper sensor and a hole adjacent the lower sensor on cart 102. Other articles 101 or containers 104 may be indicated by, for example, two holes or two blocked holes. The use of three or more sensors and physical features on cart 102 can be used to distinguish further articles 101 or containers 104.

According to aspects of the invention, other sensors that may be located in, near, or adjacent to loading position 106, for example, on sensor tree 113, may include height determination sensors. Also, in one aspect of the invention, one or more sensors, for example, optical or electro-magnetic sensors, may be located at an elevation corresponding to a height of at least one more than the height of the maximum number of articles 101 or containers 104 that is desired, for example, as limited by the physical head room available in the system. For example, according to one aspect of the invention, the maximum number of stacked cage bottoms that can be introduced to by the system may be 9, and the at least one height sensor in, near, or adjacent to loading position 106 may be positioned at the height of about 10 stacked cage bottoms. Similar height limitation sensors can be provided to limit the number of bottle baskets or cap baskets introduced to system 100. In one aspect, of the invention, when activated, the height sensor may direct the main control panel to automatically shut down system 100. In another aspect of the invention, an audible or visual alarm may be activated when a height sensor detects an unacceptable number of articles 101 or containers 104. In another aspect of the invention, the number of articles 101 or containers 104 may be limited by a weight sensor.

Articles 101 may be introduced to conveyors 107 manually or by automated means. In one aspect of the invention, articles 101 are removed from cart 102 automatically by means of lift tables 111. Lift tables 111, for example, a MACH LIFT 450 lift table, provided by Mack Design, Inc., may be activated manually or automatically, to lift an article 101, or a container 104, for example, a pallet, containing one or more articles 101, and place article 101 or container 104 on conveyor 107. After articles 101 or container 104 are removed from cart 102, cart 102 may be removed from loading position 106, for example, manually or automatedly, and replaced with another cart 102 for subsequent unloading. Conveyor 107 may also be activated manually or automatically. For example, conveyor 107 may be activated by the operator pressing an activation button 103 or conveyor 107 may be activated automatically when cart 102 is positioned in loading position 106 or when articles 101 or container 104 are removed from cart 102, among other triggering events, for example, as detected by one or more sensors on sensor tree 113.

Conveyor 107 transfers articles 101 or containers 104 from loading position 106 to pick position 108. As shown in FIGS. 1, 2 and 3, one or more conveyors 107 may include side rails 109, or similar structures, which assist in preventing the articles 101 or containers 104 from falling off conveyors 107. Conveyors 107 may also include a restraining barrier or stop 112 to limit the forward movement of articles 101 or containers 104 when they are transported to pick position 108. In one aspect of the invention, pick position 108 may include at least one sensor, for example, at least one optical or electro-magnetic sensor, for detecting the present of articles 101 or container 104 in the pick position 108. In another aspect of the invention, the detection of the presence of articles 101 or containers 104 may actuate a electro-mechanical stop or barrier 117 behind article 101 or container 104 on conveyor 107 which prevents subsequent articles 101 or container 104 from striking article 101 or container 104 positioned in pick position 108 and also provides a gap between articles 101 or containers 104. In one aspect of the invention, the one or more electro-mechanical stops 117 comprise stationary elastomeric, for example, rubber, bumpers that deflect or rotate to protrude above the surface of conveyor 107 to limit the movement of subsequent articles 101 or containers 104. According to one aspect of the invention, further articles 101 or containers 104 may then be loaded onto conveyor 107 in a manner similar to that described above. The presence of subsequent articles 101 or containers 104 on conveyor 107, for example, against stops 117, may also be detected by an optical or electro-magnetic sensor whereby further stops 117 are activated to limit the movement of further articles 101 or containers 104 on conveyor 107. According to this aspect of the invention, a plurality of articles 101 or containers 104, for example, having articles 101, may be lined up on conveyor 107 awaiting subsequent handling and processing. Position sensors may also be located along conveyor 107 to detect the presence and position of the plurality of articles 101 or containers 104 lined up on conveyor 107. In one aspect of the invention, at least two or more articles 101 or containers 104 may be lined up on conveyor 107. In another aspect of the invention, at least 7 containers, for example, pallets, containing articles 101, for example, cage bottoms, may be queued on conveyor 107 for subsequent handling.

In one aspect of the invention, the system 100 may also include a second sensor tree 115, or "pick-up sensor tree", located in, near, or adjacent to pick position 108. Sensor tree 115 may include one or more of the sensors described with respect to sensor tree 113. For instance, sensor tree 115 may include one or more sensors adapted to detect the nature of the article 101 or container 104, for example, a cage bottom pallet or a cap and bottle basket (for example, by means of one or more physical feature sets, as described with respect to sensor tree 113); or to determine when the number of desired articles 101 or containers 104 exceeds the desired number (again, as described with respect to sensor tree 113). In addition, sensor tree 115 may also include one or more sensors to detect whether articles 101, for example, stacked cage bottoms, or containers 104, for example, bottle basket or cage bottom pallet, are properly positioned for further handling, for example, properly positioned so that they can be grasped by the gantry end-of-arm tooling (discussed below). If misalignment occurs, the sensors may activate an alarm to advise the operator of the misalignment. According to one aspect of the invention, sensor tree 115 may also include one or more sensors which detect the stack height or the number of articles 101 or containers 104 present in pick position 108, for example, when no articles 101 or containers 104 are present in pick position 108. For example, according to one aspect of the invention, when a plurality of stacked cage bottoms are mounted on a pallet positioned in pick position 108, one or more sensors located in, near, or adjacent to pick position 108 may detect the height of the stack of cage bottoms as cage bottoms are removed from pick position 108 for further handling, for example, placement in washer 110. According to another aspect of the invention, one or more sensors determine when all the cage bottoms have been removed and the unloaded pallet is left in pick position 108. In this aspect of the invention, different gantry arm-end tooling may be activated to grasp and position the pallet in washer 110.

According to one aspect of the present invention, articles 101 are transported from pick position 108 to washer 110 by means of conveyor system 120. Conveyor system 120 may be any conveyor system that can transport articles 101 or containers 104 from pick position 108 to washer 110. In one aspect of the present invention, conveyor system 120 comprises a gantry-type robot, for example, an HTR 4HZR Gantry Robot manufactured by the Daedal Division of Parker Hannifin Corporation of Irwin, Pa., though other types of gantry-type robots may be used.

In one aspect of the invention, conveyor system 120 comprises a multi-axis gantry-type robot, for example, the Gantry Robot referenced above. The gantry-type robot may be a double-axis robot system, for example, a robot system that translates articles 101 or containers 104 in the X and Z directions as shown by coordinate axes 160 shown in FIGS. 1 and 2. In another aspect of the invention, conveyor system 120 may also be a triple-axis robot system, for example, a robot system that translates articles 101 or containers 104 in the X, Y, and Z directions as shown by coordinate axes 160. In the aspect of the invention shown in FIGS. 1, 2, and 3, conveyor system 120 comprises a three-axis gantry system having at least one arm-end tool 300 that is adapted to transfer articles 101 or containers 104 from either pick position 108 to either washer 110. Though two parallel lines are shown in FIGS. 1, 2, and 3, in one aspect of the invention, only a single line having a single conveyor 107 and a single washer 110 may also be used, for example, requiring only a two-axis conveyor 120.

The multi-axis gantry-type robot conveyor system 120 shown in FIGS. 1, 2, and 3, for example, an HTR 4HZR Series Gantry Robot gantry-type robot conveyor system provided by Parker Hannifin Corporation, includes conventional structural supports, electronic and hydraulic control system, drive motors, drive shafts, bearings, power cables, hydraulic hoses, cable trays, and related items that are conventionally supplied with such systems. Some structures and components are not illustrated in FIGS. 1, 2, and 3 to facilitate illustration and discussion of the invention. See, for example, the technical description of the Parker Hannifin HTR 4HZR Series Gantry gantry-type robot provided on-line or in a Parker Hannifin HTR 4HZR Series manual (the disclosure of which is incorporated by reference herein in its entirety). According to the aspect of the invention shown in FIGS. 1, 2, and 3, gantry system 120 includes arm-end tooling (or simply "tooling" or "tool") 300, the operation and position of which is determined by the electronic and hydraulic control system (not shown) of gantry system 120. Detailed views of arm-end tooling 300 are provided in FIGS. 4, 5, and 6.

Figure 4:
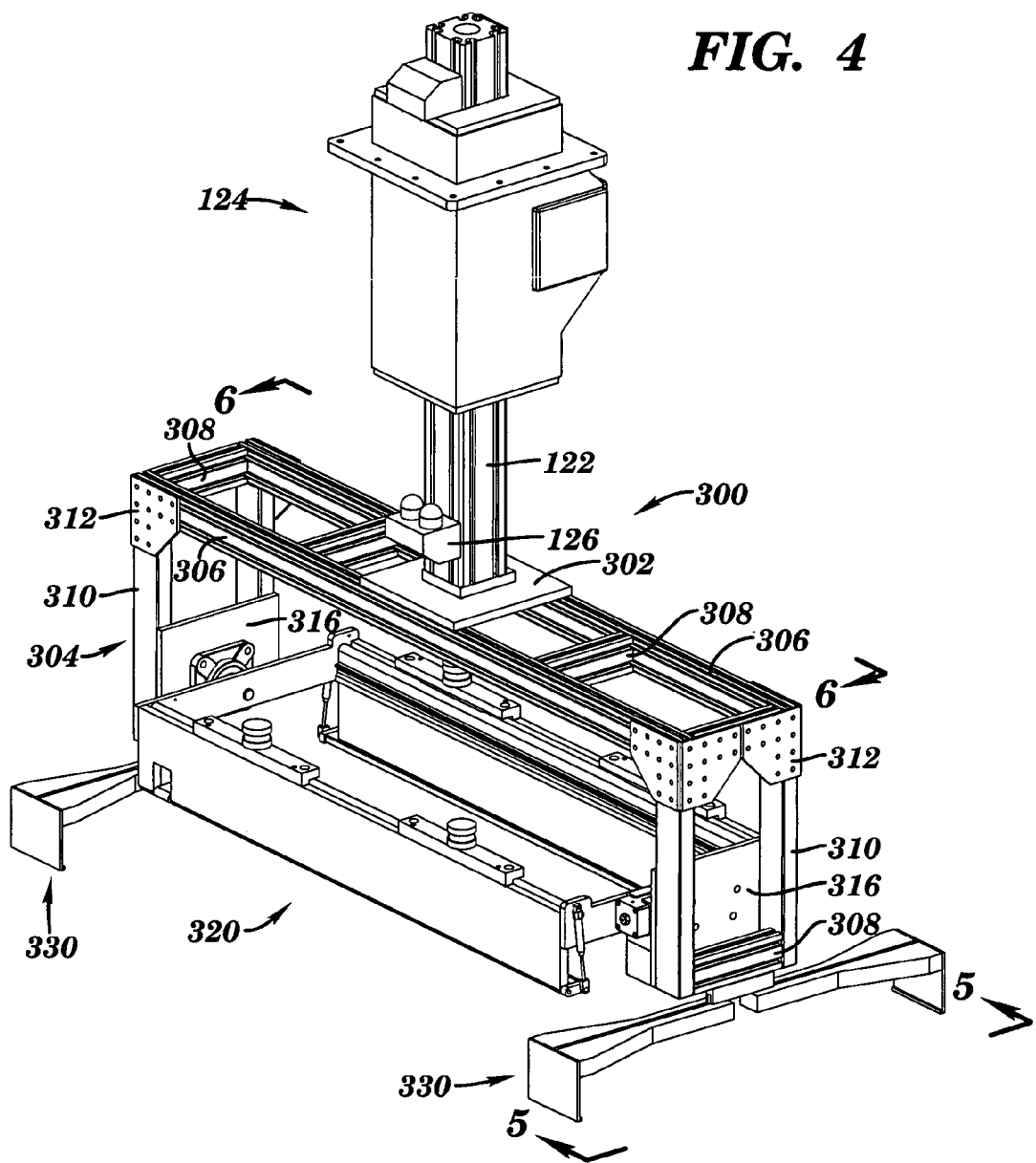
FIG. 4 is a perspective view of an arm-end tool according to one aspect of the present invention.

FIG. 4 is a perspective view of arm-end tool 300 according to one aspect of the present invention. FIG. 5 is side elevation view of the arm-end tool 300 as viewed along lines 5-5 in FIG. 4 and FIG. 6 is a front elevation view of arm-end tool 300 as viewed along lines 6-6 in FIG. 4. As shown in FIGS. 4, 5, and 6, arm-end tool 300 is mounted to a vertical beam 122 of gantry conveyor 120. Vertical beam 122 is vertically driven by gantry motor assembly 124, for example, a conventional gantry motor provided by Parker Hannifin, which is mounted to one of the horizontal beams (not shown) of gantry conveyor 120. Vertical beam 122 may include one or more stops 126 that limit the travel of vertical beam 122. Arm-end tool 300 is mounted to vertical beam 122 by means of mounting plate 302, for example, by means of mechanical fasteners (not shown).

Arm-end tool 300 comprises a structural frame 304 mounted to mounting plate 302, for example, by welding or mechanical fasteners (not shown). Mounting plate 302 may be a steel or aluminum plate having a thickness of between about 0.5 to about 2.0 inches. As shown most clearly in FIG. 4, structural frame 304 includes appropriate horizontal longitudinal members 306, cross members 308, and vertical members 310 attached by appropriate fastening members, for example, gussets 312, and mechanical fasteners or welding. Members 306, 308, and 310 may comprise any type of structural element for example, angles, beams, tubing, etc., made from carbon steel, stainless steel, aluminum, titanium, or related structural materials. In one aspect of the invention, members 306, 308, and 310 may comprise extruded aluminum, for example, extruded aluminum framing and accessories provided by the company 80/20 Incorporated of Columbia City, Ind., though other types of framing systems may be used. According to one aspect of the invention, structural members 306, 308, and 310 have nominal sizes of about 1 inch to about 2½ inches, but the dimensions of these members will vary by application. In one aspect of the invention, one or more structural members 306, 308, and 310 may comprise cavities or passages for routing electrical wiring or control, cooling, or lubricating fluids, that is, liquids or gases. For example, in one aspect of the invention, one or more structural members 306, 308, and 310 may contain internal passages for carrying hydraulic fluids or compressed air. As shown in FIG. 4, arm-end tool 300 may also include side plates 316 mounted to vertical members 310 by mechanical fasteners or welding. Plates 316 may also be carbon steel, stainless steel, aluminum, titanium, or related structural materials, and have a nominal thickness of from about 0.5 inches to about 2.0 inches.

Figure 7:
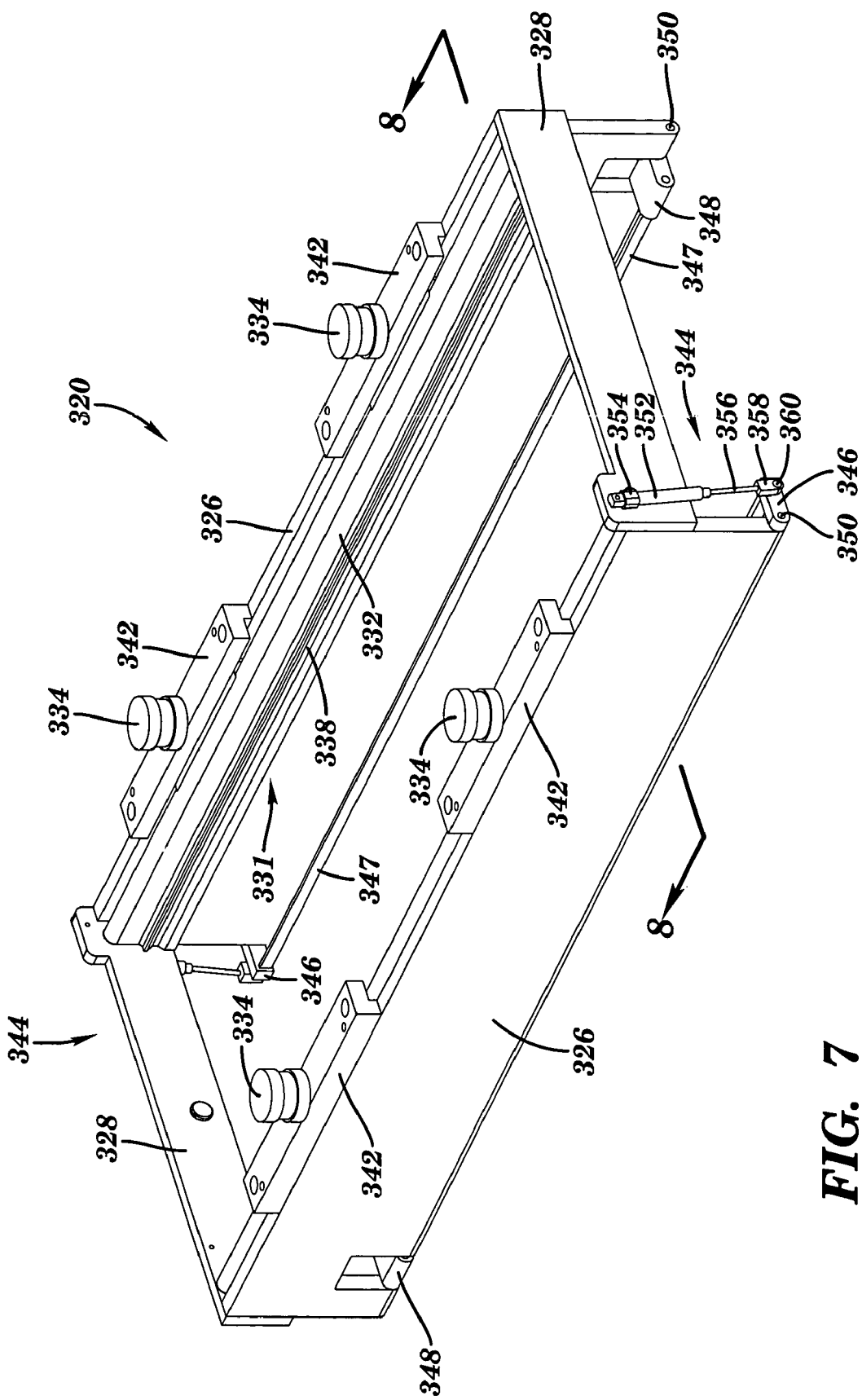
FIG. 7 is a perspective view of one aspect of the arm-end tool shown in FIG. 6.

According to one aspect of the invention, tool 300 grasps the articles 101 by means of the rectangular assembly 320, which may be referred to as a "halo" assembly. Halo assembly 320 may be used to grasp at least one, typically, at least two, articles 101 (for example, at least two rat cages) so that they can be transported by gantry conveyor 120. In one aspect of the invention, halo assembly 320 can grasp at least four articles 101, for example, at least four mouse cage bottoms. As shown most clearly in FIG. 6, halo assembly 320 is rotatably mounted to plates 316 of frame 304 by means of rotary actuator assembly 322, for example, a PH-XR157-190LT-RB22M-A rotary actuator provided by Parker Hannifin, and bearing assembly 324, for example, a conventional roller bearing assembly provided by numerous suppliers. A detailed view of halo assembly 320 is shown in FIG. 7 and is discussed in further detail below. Though FIGS. 4, 5, and 6 illustrate an arm-end tool 300 having a single halo assembly 320, according to one aspect of the invention, arm-end tool 300 may include two or more halo assemblies 320. For example, each halo assembly 320 may be adapted to grasp one or more articles, for instance, each halo assembly 304 may be adapted to grasp four mouse cage bottoms each. The two or more halo assemblies 320 may be mounted on a single frame 304 or on individual frames 304.

According to another aspect of the invention, tool 300 may also include at least one gripper assembly 330 mounted to frame 304. Gripper assembly 330 may be used to grasp articles 101 or containers 104, for example, bottle baskets or pallets, so that they can be transported by gantry conveyor 120. As shown in FIGS. 4, 5, and 6, tool 300 may include two gripper assembles 330 mounted on either end of frame 304. Gripper assembly 330 may be mounted to one of the cross members 308 of frame 304. Gripper assembly 330 may include an actuator 333, for example, a double acting, hydraulic or pneumatic cylinder or a solenoid, and at least two gripping arms 334, the movement of which is controlled by actuator 333. In one aspect of the invention, gripper assembly 330 may be omitted.

Returning to FIGS. 1, 2, and 3, according to one aspect of the present invention, washer 110 includes at least one input location 130, for example, a belt conveyor, for introducing one or more articles 101 or container 104 to washer 110. According to one aspect of the present invention, conveyor system 120 transports one or more articles 101 from pick position 108 to input location 130. In one aspect of the invention, where articles 101 comprise an open top, for example, cage bottoms, conveyor system 120 positions articles 101 wherein the open top of articles 101 are placed face down on input location 130. According to one aspect of the invention, when input location 130 comprises a belt conveyor, the belt conveyor may be operated continuously or intermittently, for example, whereby articles 101 may be positioned on input location 130 by conveyor system 120 while the conveyor belt is stationary or while the belt is in motion.

According to one aspect of the invention, the system 100 may also include one or more waste collectors or dust control units 140, for example, having a screen or grill 142. In this aspect of the invention, prior to placing articles 101 on input location 130, conveyor system 120 may dump the contents of articles 101, for example, waste bedding, into waste collectors 140. For example, in one aspect of the invention, conveyor system 120 may invert articles 101 containing waste, for example, a cage bottom containing bedding, above a waste collector 140 whereby the waste falls into waste collector 140. In another aspect of the invention, conveyor system 120 may place the inverted article above or on a grill 142 of waste collector 140 and agitate article 101 or strike grill 142 with article 101 to assist in discharging any waste from article 101. In another aspect of the invention, one or more mechanical agitators or scrapers 144 may be mounted above waste collectors 140 and the scrapers 144 can be used to physically dislodge any waste material that is not dislodged by simply overturning the article, for example, a cage bottom. In one aspect of this feature of the invention, the mechanical scrapers 144 may comprise projections or "fingers", for example, projections having plastic or rubber tips, over which the open end of article 101 is positioned. The one or more projections may be moved within the stationary article 101, or article 101 may be moved relative to the one or more stationary projections. In one aspect of this feature, both the article and the projection may be moved to assist in removing any stubborn waste from article 101. According to one aspect of this feature, the scrapers 144 may comprise a scraper system provided by Mach Design Inc., or its equivalent. In one aspect of the invention scrapers 144 comprises a plastic material, an elastomeric material, or a composite material, for example, to minimize damage to the article being handled. Though not shown in FIGS. 1, 2, and 3, the discharging of waste from articles 101 may also be assisted by directing a stream of fluid, for example, water or air, into article 101.

According to another aspect of the invention, handling system 105 may also include an auxiliary article handling station 150 (shown in phantom). For example, in one aspect of the invention, articles 101 may comprise containers having covers, lids or stoppers, for example, bottles having lids, and auxiliary handling station 150 may be a cover, lid, or stopper removal and container emptying station. In one aspect of the invention, handling station 150 may comprise a bottle washing or bottle dumping station, for example, an ASC-100IL-UC uncapping and dumping system provided by Allentown Caging Equipment Co., or its equivalent. According to one aspect of the invention, after the articles, for example, bottles and bottle caps are handled in handing station 150, conveyor 120 may be used to transport articles 101 from handling station 150 to washer 110.

Figure 8:
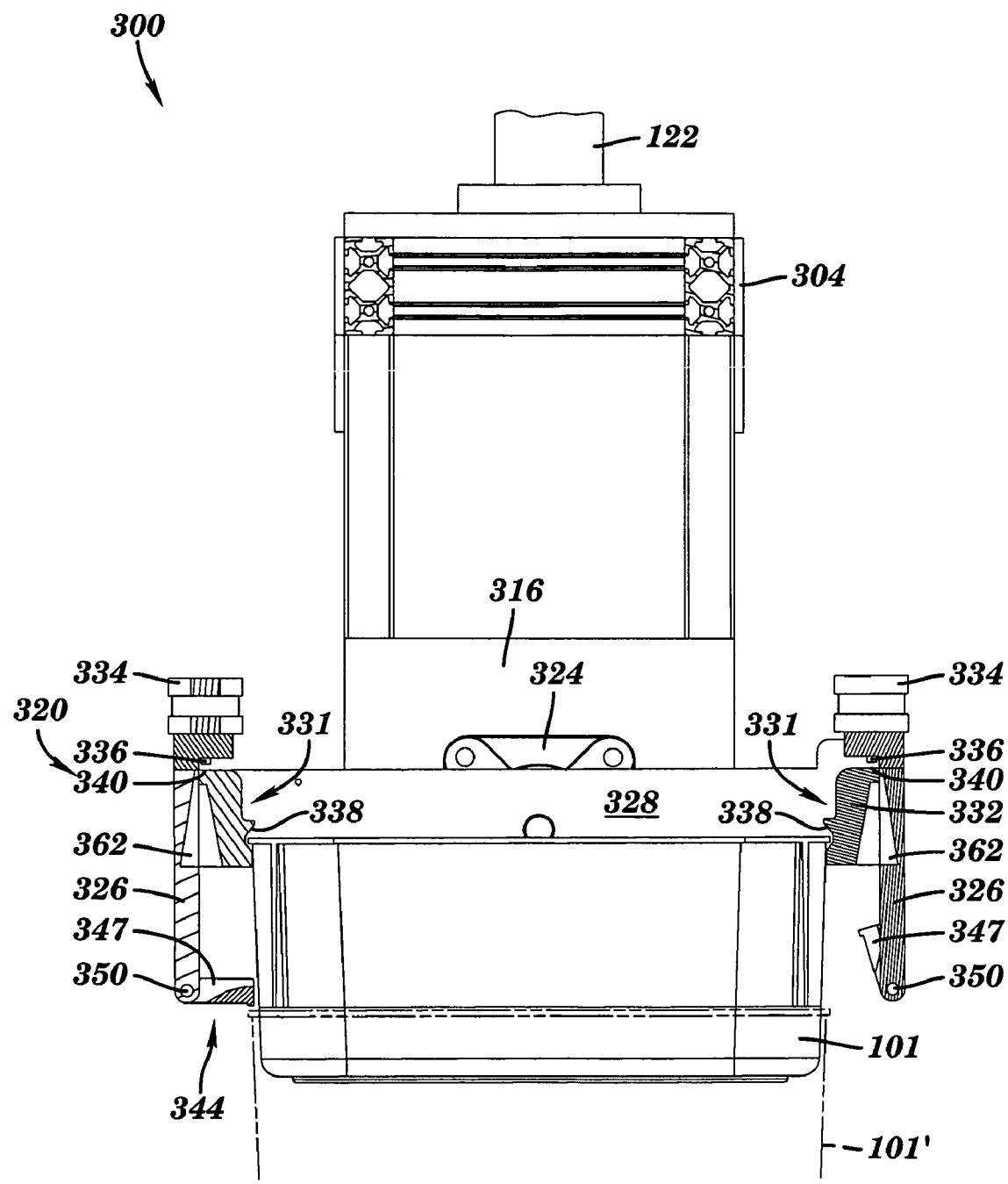
FIG. 8 is a cross-sectional view of the aspect of arm-end tool shown in FIG. 7 as viewed along lines 8-8.

FIG. 7 is a perspective view of the halo assembly 320 shown in FIGS. 4, 5, and 6. FIG. 8 is a cross-sectional view of halo assembly 320 as viewed along lines 8-8 of FIG. 7. As shown in FIG. 7, halo assembly 320 comprises a rectangular box structure having long sides 326 and short sides 328. Short sides 326 are typically rotatably mounted to the structural frame 304, for example, by means of actuator assembly 322 and bearing assembly 324 (see FIGS. 3, 4, and 5). Sides 326 and 328 are typically made from metallic plate, for example, 0.25 to 2.0 inch thick carbon steel, stainless steel, aluminum, or titanium plate, among other appropriate structural materials. In one aspect of the invention, plates 326 and 328 are non-metallic, for example, plastic, for instance, high-density polyethylene, among other plastics. In addition, plates 326 and 328 may be machined plate, forgings, or castings. Plates 326 and 328 may be attached to each other by conventional means for example, by means of mechanical fasteners, for example, threaded fasteners, or by welding.

According to this aspect of the invention, halo assembly 320 also comprises at least one gripper assembly 331 for engaging one or more articles 101 handled by tool 300, for example, one or more cage bottoms 101 shown in FIG. 8. In one aspect of the invention, halo assembly 320 includes gripper assembly 331 having a pair of gripper arms 332 rotatably mounted in halo assembly 320, for example, rotatably mounted to short side plates 328, for example, by journal or roller bearings (not shown). According to one aspect of the present invention, halo assembly 320 includes at least one piston assembly 334 having a rod 336 that engages gripper arms 332 to cause the gripper arms 332 to rotate whereby gripper arms 332 engage article 101. Piston assembly 334 may be a pneumatic or hydraulic piston assembly, as is conventional, for example, a 0.75NLP9x.50-cylinder piston assembly provided by Parker Hannifin, or its equivalent Piston assembly 334 may be actuated, that is extended or withdrawn, in response to a control signal provided by wiring or conduit not shown in these figures. The control signal may be an electrical, hydraulic, or pneumatic control signal provided by a local or centralized controller (not shown). According to one aspect of the invention, gripper arms 332 may be biased into a deflected position or a retracted position, for example, they may be "spring loaded" by one or more springs (not shown). According to one aspect of the invention, plates 326 may include recesses 362 into which gripper arms 332 retract.

Piston assemblies 334 may be mounted directly to sides 326 or 328 or may be mounted to a mounting bracket 342, for example, an L-shaped mounting bracket, mounted to sides 326 by conventional means, for example, by threaded fasteners or welding. As shown in FIGS. 7 and 8, gripper arms 332 comprise elongated structures having a contoured, article-engaging surface 338 and a piston rod engaging surface 340. Gripper arms 332 may be metallic or non-metallic, for example, gripper arms 332 may be made from steel, stainless steel, aluminum, or titanium plate, among other appropriate structural metal, or from high-density polyethylene, among other plastics. In one aspect of the invention, gripper arms 332 include at least one region of elastomeric material, for example, a natural rubber or synthetic rubber, for instance, neoprene, EPDM, or their equivalents. According to this aspect of the invention, the elastomeric material provides a resilient surface that can more readily grasp and restrain the article 101 being transferred.

According to another aspect of the invention, halo assembly 320 may include a stripper assembly 344. As shown in FIGS. 7 and 8, stripper assembly 344 may comprise at least one linkage arm 346 mounted to at least one plate 326, for example, rotatably mounted to the bottom of at least one of, preferably both of, plates 326, and at least one elongated bar 347 attached to at least one linkage arm 346 and extending at least partially along the length of plate 326. Bar 347 may assume various geometries depending upon the articles being handled. As shown in FIG. 7, when halo assembly 320 is used to handle mouse cages, bar 347 may simply be a rectangular bar. In the aspect of the invention shown in FIG. 7, stripper assembly 344 comprises at least two linkage arms 346 and 348 rotatably mounted to plates 326, for example, by means of one or more pins 350, and one bar 347 is mounted to both linkage arms 346 and 348. According to one aspect of the invention, two bars 347 are mounted by linkage arms 346 and 348 to each plate 326. According to one aspect of the invention, at least one of bar 347, linkage arms 346 or linkage arm 348 may be biased into an deflected position or a retracted position, for example, "spring loaded", by one or more springs (not shown).

According to the aspect of the invention shown in FIGS. 7 and 8, the movement of stripper assembly 344 is controlled by at least one piston assembly 352. Piston assembly 352 may be a 0.31 PSR1.00 cylinder piston assembly provided by Parker Hannifin, or its equivalent. Piston assembly 352 has a first end 354 mounted to plate 328, for example, rotatably mounted by means of one or more mechanical fasteners, and a piston rod 356 pivotally mounted to linkage arm 346 by means of a rod end 358 and a pin 360. According to the aspect of the invention shown in FIGS. 7 and 8, at least one, preferably at least two, stripper assemblies 344 are provided, for example, mounted on opposite plates 328. Piston assembly 352 may be actuated, that is extended or withdrawn, in response to a control signal provided by wiring or conduit not shown in these figures. The control signal may be an electrical, hydraulic, or pneumatic control signal provided by a local or centralized controller (not shown).

According to one aspect of the present invention, stripper assembly 344 may be used to displace or "strip" one or more articles 101 or containers 104 from a set of nested articles 101 or containers 104. For example, as shown in FIG. 8, in which halo 320 of arm-end tool 300 handles cage bottoms 101, in one aspect of the invention, nested cage bottoms 101 and 101' (partially shown in phantom) may be difficult to separate by simply grasping cage bottom 101 with gripper arms 332 and lifting. In the context of the present invention, the term "nested" refers to articles having exposed cavities and are so shaped that similar or identical articles may be inserted into the exposed cavities when stacking the articles. For various reasons, the snug fit that my result, for example, the snug fit of cage bottom 101 into cage bottom 101', may prevent the cage bottoms from separating easily, for example, by gravity, and the lower cage bottom 101' may adhere to and be lifted with cage bottom 101 when cage bottom 101 is lifted by tool 300. According to this aspect of the present invention, stripper assembly 344 provides a means of minimizing or preventing the adherence of cage bottom 101' to cage bottom 101. In one aspect of the invention, at least one bar 347 is used to strike cage bottom 101 or cage bottom 101' to disengage or "strip" cage bottom 101' from cage bottom 101. The deflection of bar 347 may be effected by the actuation of piston assembly 352. When deflected, bar 347 may impact the upper edge of the lower cage bottom 101' and displace or dislodge lower cage bottom 101' from upper cage bottom 101. In one aspect of the invention, cage 101' and 101 are disengage by the deflection and impact of at least two bars 347. In the aspect of the invention shown in FIG. 8, the left hand-bar 347 is shown in the extended or "stripping" position; the right-hand bar 347 is shown in the retracted position.

According to one aspect of the present invention, the handling system 100 shown in FIGS. 1, 2, and 3 operates as follows. Articles 101 or containers 104 are introduced to the system automatically or manually, for example, by manually transporting rack 102 to loading position 106. Articles 101 or containers 104 are then mounted on conveyor 107, again, either automatically or manually, for example, articles 101 or containers 104 may be transferred from cart 102 by means of lift table 111. During or after transfer of articles 101 or containers 104 to conveyor 107, the number, type, height or other characteristic of articles 101 or containers 104 may be detected by sensor tree 113 and this data entered into the control system. The automatic transfer may be initiated by an operator by pressing activation buttons 103. Articles 101 or containers 104, for example, stacked containers 104 having articles 102, may be transferred from position 106 to position 108 by conveyors 107. As shown in FIGS. 1 and 2, conveyor 107 may be a conveyor having two belts upon which articles 101 and containers 104 may be conveyed. For example, in one aspect of the invention articles 101, for example, bottles may be conveyed on one conveyor while a container 104, for example, a bottle basket, may be conveyed simultaneously on the other conveyor.

The following discussion summarizes the operation of conveyor 120 of system 100 according to one aspect of the present invention. The following discussion assumes that the articles conveyed to position 108 comprises stacked cage bottoms mounted on a pallet and arranged in sets of four cage bottoms. It will be apparent to those skilled in the art that this discussion can apply to other articles 101 and containers 104. Upon conveyance to position 108, the type, quantity, height, or other characteristic of the cage bottoms may be detected by sensor tree 115 and, for example, the operation of system 100 modified accordingly. According to the one aspect of the present invention, the cage bottoms are transferred from position 108 by conveyor 120 having arm-end tool 300 shown in FIGS. 4, 5, and 6. Conveyor 120 positions tool 300 over the set of four cage bottoms and then grasps the set of four cage bottoms as described with respect to FIGS. 4, 5, and 6. If necessary, the set of cage bottoms may be stripped from the next nested cage bottoms using stripper assembly 344 of tool 300 as also described above. Conveyor 120, using tool 300, then inverts the set of cage bottoms by rotating tool 300, for example, by means of rotating actuator 322, and transfers them to washer inlet location 130. If system 100 includes an auxiliary handling station 150, for example, a cage bottom pretreatment, conveyor 120 may first convey the cage bottoms to the handling station and, after handling, transfer the cage bottoms to inlet location 130. Prior to placing the cage bottoms on inlet location 130, conveyor 120 may dump the contents, if any, of the cage bottoms into waste collectors 140. The discharge of material from the cage bottoms may be aided by positioning the inverted cage bottoms on scrappers 144 and either agitating scrappers 144 or agitating the cage bottoms to scrape any stubborn material from the cage bottoms. After placing the cage bottoms onto inlet location 130, the conveyor of washer 110 transfers the cage bottoms into the washer to wash the cage bottoms. Conveyor 120 may return to pick the next set of cage bottoms from position 108 and repeat the handling process.

Figure 9:
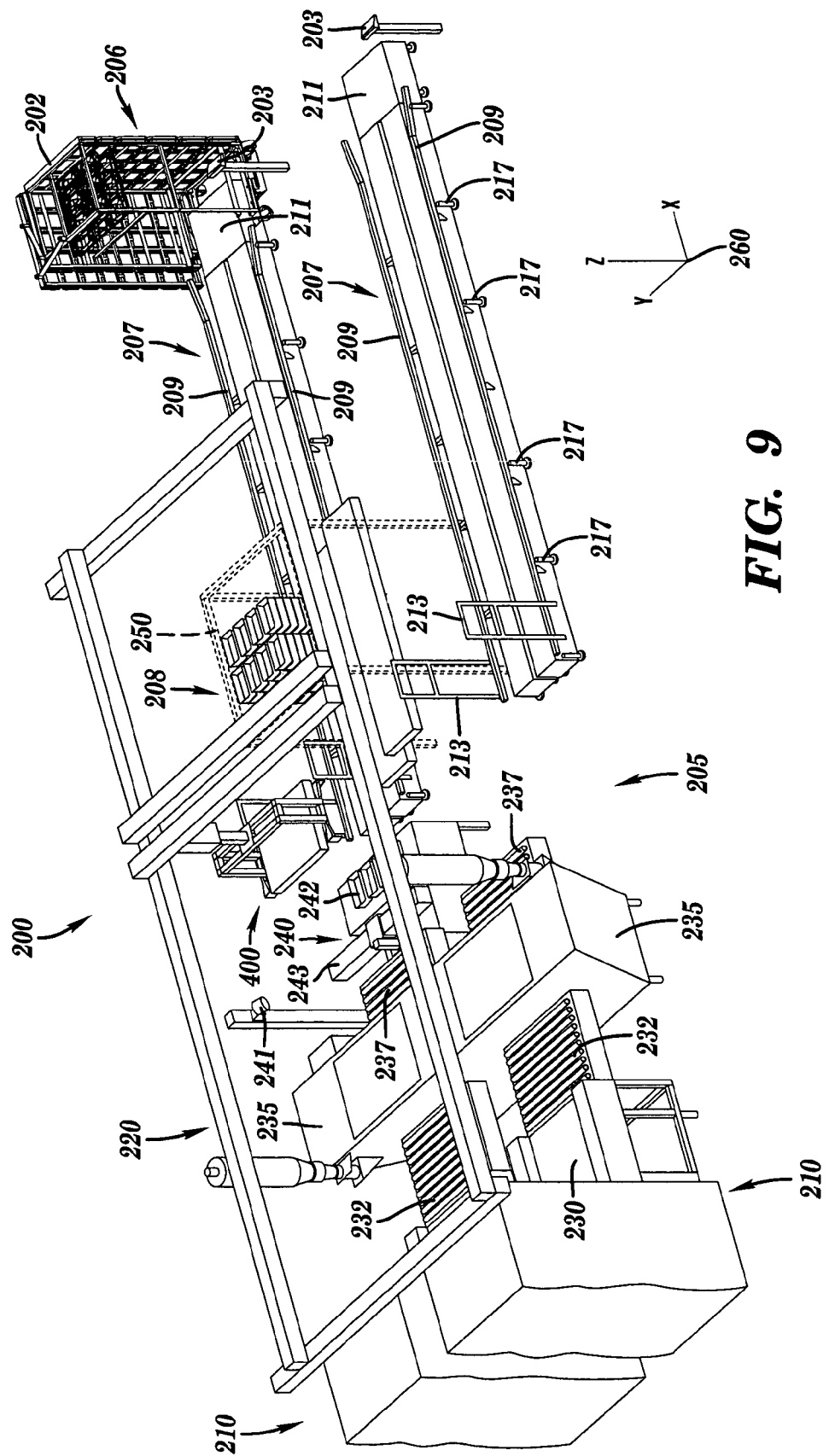
FIG. 9 is a left-hand perspective view of handling system for discharging articles from an automatic washer according to one aspect of the invention.
Figure 10:
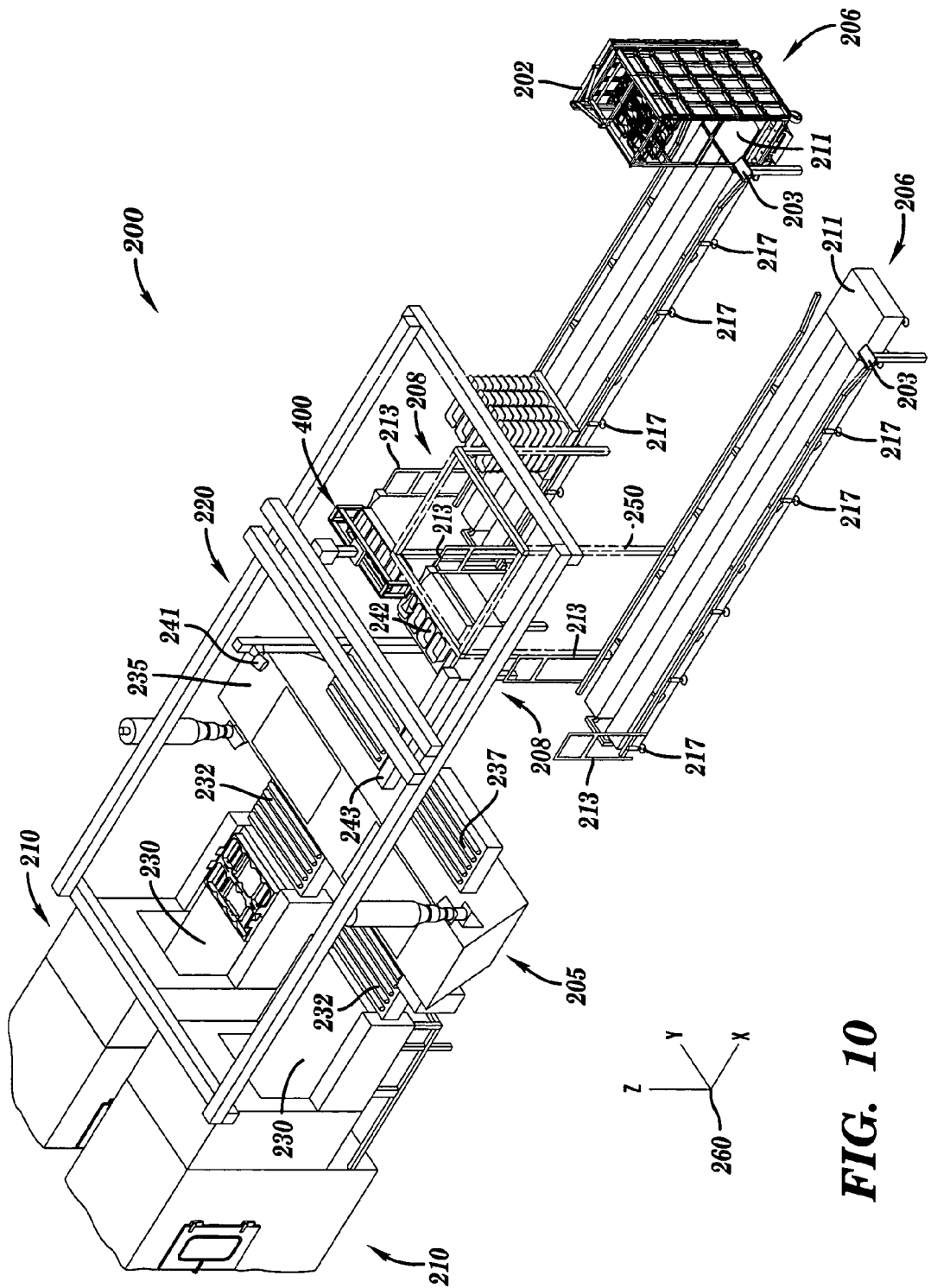
FIG. 10 is a right-hand perspective view of the handling system shown in FIG. 9.
Figure 11:
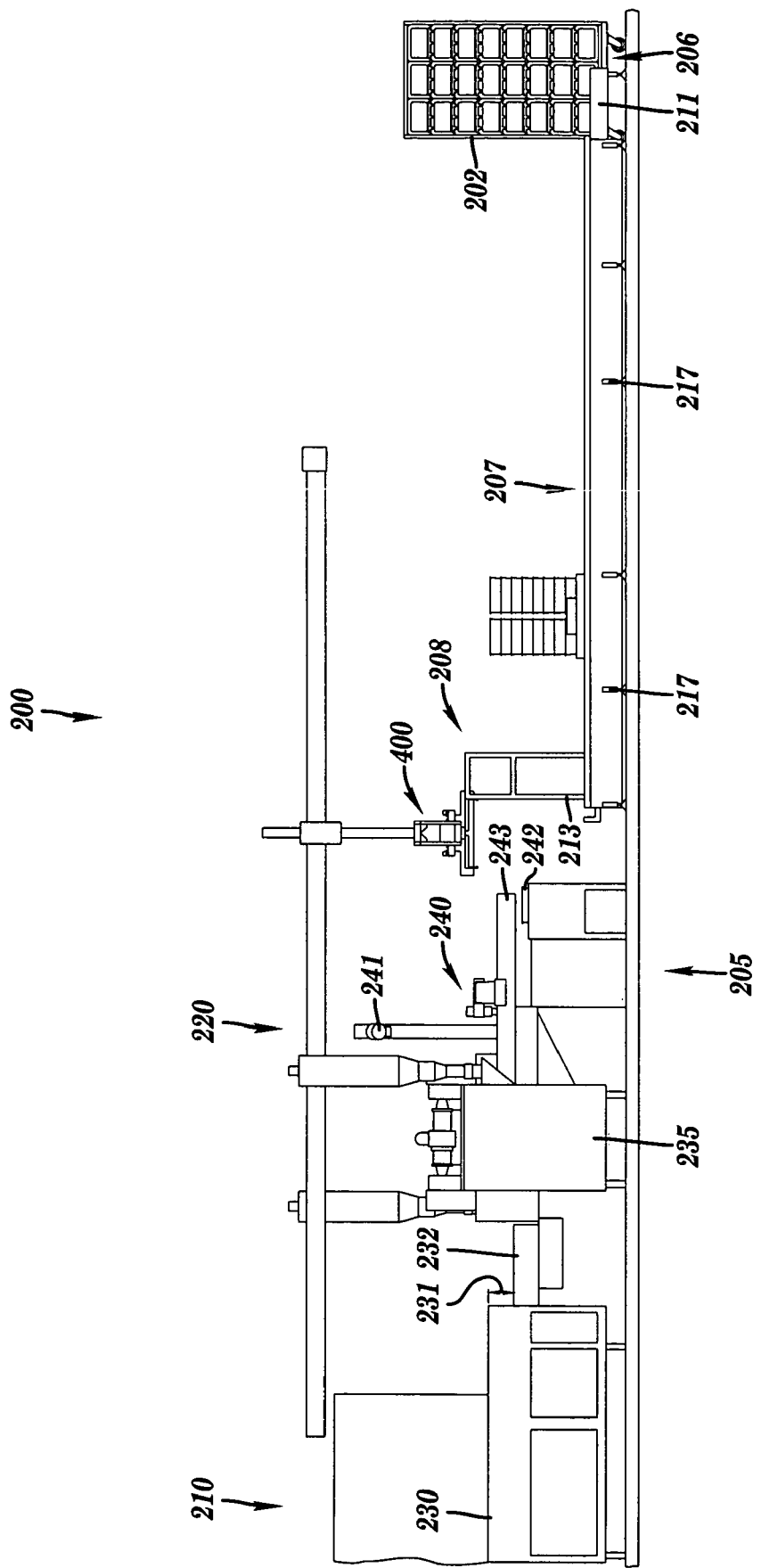
FIG. 11 is a side elevation view of the handling system shown in FIGS. 9 and 10.

FIG. 9 is a left-hand perspective view of a handling system 200 according to another aspect of the present invention. FIG. 10 is a right-hand perspective view of handling system 200 shown in FIG. 9. FIG. 11 is a side elevation view of the handling system 200 shown in FIGS. 9 and 10. Handling system 200 includes an unloading system 205 that removes washed articles 201 or containers 204 from a washer 210, for example, the same washer 110 described with respect to FIGS. 1, 2, and 3. Unloading system 205 may include one or more conveyor systems 207, for example, belt conveyor systems, and one or more conveyor systems 220, for example, a gantry-type conveyor system. Handling system 200 is also marketed under the name Mack Animal Cage Handling (MACH) System by Mack Design, Inc. of West Henrietta, N.Y., for example, the MACH 300 Series or MACH 350 Series system.

The types of articles 201 and containers 204 that may be handled by system 200 are essentially the same as the articles 101 and containers 104 discussed with reference to FIGS. 1, 2, and 3. As discussed above, with respect to system 100 shown in FIGS. 1, 2, and 3, as will be recognized by those familiar with the materials handling art, aspects of the present invention shown in FIGS. 9, 10, and 11 may also used to handle articles for processing other than washing. For example, aspects of the present invention may be used to handle and introduce articles for many types of processing or material handling, including inventory control and retrieval, food processing, machining, fabrication, and assembly facilities, and sorting, orienting, and stacking facilities, among many others.

According to one aspect of the present invention, washer 210 discharges articles 201 or containers 204 to at least one output location 230, for example, a belt conveyor from washer 210. Typically, washer 210 directs water in an upward direction as the articles 201, for example, overturned cage bottoms or bottles, are transported through washer 210 on a fluid permeable, perforated conveyor belt. As a result, articles 201 and containers 204 may typically be arranged in a haphazard manner as they emerge from washer 210 on output location 230. According to one aspect of the invention, when output location 230 comprises a belt conveyor, the belt conveyor may be operated continuously or intermittently, whereby washed articles 201 or container 204 may be unloaded while the conveyor belt is stationary or while the belt is in motion.

In one aspect of the invention, washed articles 201 or containers 204 may be removed from output location 230 by conveyor system 220 and transported to a first position 208 adjacent to belt conveyor 207, for example, a belt conveyor similar to conveyor 107 discussed with respect to FIGS. 1, 2, and 3. For example, single articles 201 or containers 204, for example, pallets or baskets, may be transported directly from output location 230 to first position 208 by conveyor system 220. According to one aspect of the invention, the conveyor 230 may be momentarily stopped to facilitate the grasping and removal of articles 201, for example, when handling a cage bottom pallet. In one aspect of the present invention, conveyor system 220 comprises a gantry-type robot, for example, an HTR 4HZR Gantry Robot manufactured by the Daedal Division of Parker Hannifin Corporation similar to conveyor 120 shown in FIGS. 1, 2, and 3, though other types of gantry-type robots may be used.

According to one aspect of the invention, belt conveyor 207 transports one or more washed articles 201 or containers 204 from first position 208 to a second position 206 on belt conveyor 207. First position 208 may include a container 204, for example, a pallet, for assembling and transporting multiple articles 201 from first position 208 to second position 206 by means of belt conveyor 207. According to one aspect of the invention, container 204 may emerge from washer 210 prior to articles 201 and may be positioned in first position 208 and await placement of articles 201 in position 208. Second position 206 may correspond with a cart 202, for example, a cart similar to cart 102 described with respect to FIGS. 1, 2, and 3. Belt conveyor 207 may be similar to belt conveyor 107 described with respect to FIGS. 1, 2, and 3 above. As shown in FIGS. 9, 10, and 11, conveyors 207 may include side rails 209, or similar structures, which assist in preventing the articles 201 or containers 204 carrying the articles 201 from falling off conveyors 207. Conveyors 207 may also include a restraining barrier or stop 212 (not shown) to limit the forward movement of articles 201 or their container 204 when they are transported to second position 206. Second position 206 may also include a lift table 211 for unloading articles 201 or containers 204 from conveyors 207, for example, a lift table similar to lift table 111 shown in and described with respect to FIGS. 1, 2, and 3. The unloading of conveyor 207, for example, by means of lift table 211, may be effected manually or automatically. For example, an operator my actuate lift table 211 by pressing one or more activation buttons 203.

As described with respect to conveyor 107 in FIGS. 1, 2, 3, system 200 in FIGS. 9, 10, and 11 may also have at least one sensor, for example, an optical or electro-magnetic sensor, for detecting the presence of articles 201 or containers 204 in first position 208. The sensors located in first position 208 may be located on one or more sensor support structures 213, for example, a structure similar to sensor trees 113 and 115 shown in and described above with respect to FIGS. 1, 2, and 3. As before, sensor support structures 213 may include one or more sensors, for example, one or more optical or electro-magnetic sensors, adapted or programmed to determine, for example, that bottles are being handled by system 200 or that cage bottoms are being handled by system 200, and accordingly vary the handling procedure. In one aspect of the invention, two sensor support structures 213 containing electro/mechanical actuators positioned opposite each other on either side of first position 208 may be provided. In this aspect of the invention, at least one electro-mechanical actuator may interface with a physical feature set, for example, a recess or projection, on cart 202, for example, a UniMac cart, located in second position 208, as discussed above with respect to system 100.

In another aspect of the invention, the detection of the presence of articles 201 or containers 204 may actuate a electro-mechanical stops or barriers 217 behind article 201 or container 204 on conveyor 207 which prevents subsequent articles 201 or containers 204 from striking articles 201 or containers 204 positioned in position 208 and also provides a gap between articles 201 or containers 204. In one aspect of the invention, the one or more electro-mechanical stops 217 may comprise stationary elastomeric, for example, rubber, bumpers that deflect or rotate to protrude above the surface of conveyor 207 to limit the movement of subsequent articles 201 or containers 204. According to one aspect of the invention, further articles 201 or containers 204 may then be unloaded from conveyor 207, for example, by means of a lift table 211. The presence of subsequent articles 201 or containers 204 on conveyor 207, for example, against stops 217, may also be detected by a sensor, for example, an optical or electro-magnetic sensor, whereby further stops 217 are activated to limit the movement of further articles 201 or containers 204 on conveyor 207. According to this aspect of the invention, a plurality of articles 201 or containers 204, for example, having articles 201, may be lined up on conveyor 207 awaiting subsequent unloading and further processing. Position sensors may also be located along conveyor 207 to detect the presence and position of the plurality of articles 201 or containers 204 lined up on conveyor 207. In one aspect of the invention, at least two or more articles 201 or containers 204 may be lined up on conveyor 207. In another aspect of the invention, at least 7 containers, for example, pallets, containing articles 201, for example, cage bottoms, may be queued on conveyor 207 for subsequent unloading.

In one aspect of the invention, conveyor system 220 comprises a multi-axis gantry-type robot, for example, the HTR 4HZR Gantry Robot referenced above. The gantry-type robot may be a double-axis gantry system, for example, a gantry system that translates articles 201 in the X and Z directions as shown by coordinate axes 260 shown in FIGS. 9 and 10. In another aspect of the invention, conveyor system 220 may also be a triple-axis gantry system, for example, a robot system that translates articles 201 in the X, Y, and Z directions as shown by coordinate axes 260.

According to one aspect of the invention, conveyor system 220 in FIGS. 9, 10, and 11 includes arm-end tool 400, for example, arm-end tool similar to arm-end tool 300 illustrated in FIGS. 4, 5, 6, 7, and 8. One typical arm-end tool 400 that may be used is essentially identical to the arm-end tool 300 illustrated in FIGS. 4, 5, 6, 7, and 8. In another aspect of the invention, arm-end tool 400 may be identical to the arm-end tool 300, but without stripper assembly 344, that is, without the "cage stripper". According to this aspect of the invention, since the articles 201 assembled on, for example, staging position 242, will typically not be stacked or nested, there will typically be no need provide the "stripping" function provided by stripper assembly 344. However, in one aspect of the invention, arm-end tool 400 includes a stripper assembly 344 for stripping nested articles. In another aspect of the invention, arm-end tool 400 includes at least one gripper assembly 330 shown in FIGS. 4, 5, 6; in another aspect of the invention, gripper assembly 330 may be omitted from arm-end tool 400.

According to one aspect of the invention, the articles 201 and containers 204 may be located in second position 208 by conveyors 220 or conveyor 243. For example, in one aspect of the invention, conveyor 220 may transport a container 204, for example, a cage pallet, from washer 210 to second position 208 and vision system conveyor 243 may transport articles 201, for example, cage bottoms, from conveyor 237 directly to second position 208, for example, without positioning the articles in staging position 242. In this aspect of the invention, conveyor 220 may be less active than in other aspects of the invention. According to another aspect of the invention, handling system 200 may also include a lift table (not shown) located in second position 208, for example, a lift table similar to lift tables 111 and 211. In this aspect of the invention, the lift table located in position 208 may be loaded with articles by conveyor 220 or conveyor 243. When loaded as desired, for example, with cages upon a pallet, the lift table in second position 208 may transfer the pallet and cages to conveyor 207 and another pallet positioned on the lift table in second position 208, and the pallet reloaded. Again, conveyor 207 transfers the articles 201 from second position 208 to third position 206, for example, to lift table 211 and cart 202.

After assembly of one or more washed articles 201 on cart 202, cart 202 may be used to transport washed articles 201, for example, manually transported, to storage or other handling.

The aspect of the invention shown in FIGS. 9, 10, and 11 is a dual-line system having two unloading lines unloading two washers 210. However, aspects of the present invention may comprise a single line, or two or more lines of handling and washing.

In another aspect of the invention, with reference to FIGS. 9, 10, and 11, instead of conveyor system 220 transporting washed articles 201 or containers 204 to first position 208, washed articles 201 or containers 204 may be further handled by unloading system 205. In one aspect of the invention, for example, when articles 201 comprise cage bottoms, system 220 may include a means for inverting articles 201 in preparation for further processing. For example, in one aspect of the invention, articles 201 may be transferred from washer output location 230 to a conveyor 232, for example, a motorized roller conveyor, at an elevation lower than output location 230, for example, at least about 1 inch lower, as indicated by dimension 231 in FIG. 11. In this aspect of the invention, the difference in elevation 231 between output location 230 and conveyor 232 causes articles 201 to cascade from output location 230 to conveyor 232 whereby articles 201 are inverted, or "flipped over", for example, so that articles 201 have their open sides directed upward in preparation for further handling. Though this simple method is effective in inverting articles 201 or containers 204, other means may be provided for inverting articles 201 or containers 204.

In another aspect of the invention, for example, when articles 201 comprise cage bottoms, system 220 may further include means for introducing one or more materials, for example, bedding, to articles 201. Bedding typically comprises one of a variety of materials, for instance, pine chips, that are used to line, for example, an animal cage, to provide a comfortable surface for the animal or to absorb bodily fluids. In the aspect of the invention shown in FIGS. 9, 10, and 11, bedding may be introduced to articles 201 via an automated bedding dispenser 235. As the articles 201, for example, cage bottoms, are transferred through bedding dispenser 235 by conveyor 232, bedding is introduced to articles 201 and then articles 201 are discharged to conveyor 237, for example, a continuation of conveyor 232 or another motorized roller-type conveyor. According to one aspect of the invention, bedding dispenser 235 may comprise a "rain shower" type bedding dispenser, for example, a bedding dispenser provided by Getinge, or its equivalent.

As noted above, since articles 201 or containers 204 typically are discharged from washer 210 in a haphazard fashion, articles 201 or containers 204 may be arranged on washer output conveyor 230, conveyor 232, or conveyor 237 (after passing through bedding dispenser 235) in a haphazard manner, that is, without any pre-determined order or orientation. According to one aspect of the invention, further handling of articles 201 or containers 204 may be assisted by a means for locating articles 201 or containers 204, grasping them, and positioning them in an orderly fashion for further handling. In one aspect of the invention, the means for locating and handling articles 201 or containers 204 may include an automated locating and handling system 240. According to one aspect of the invention, the automated locating and handling system 240 comprises a vision-based locating and handling system, for example, a vision-based locating and handling system having at least one vision or camera system 241, at least one automated conveyor system 243, and a control system (not shown) for operating the vision system 241 and coordinating the operation of the conveyor system 243 as determined by vision system 241. The vision or camera system 241 and the control system may be a conventional vision and control system, for example, a vision system provided by Axis Technologies, Inc. of Fairport, N.Y., though other types of vision systems may be used. The vision or camera system 241 locates articles 201 or containers 204 on conveyor 230, 232, or 237 and controls the conveyor system 243 to grasp and transport the articles 201 or containers 204 to a predetermined location, for example, to a staging position or table 242 in an ordered fashion so that they can be readily accessed for further handling. In one aspect of the invention, further handling may comprise transport from staging position 242 to first position 208 adjacent conveyor 207.

According to one aspect of the invention, the automated conveyor system 243 of automated locating and handling system 240 may be a robot-type conveyor system, gantry-type conveyor system, or any other type of conveyor system that can be controlled by an automated controller in response to a vision or camera system 241. According to one aspect of the invention, the automated conveyor system 240 comprises the automated gantry-type conveyor system 243 shown in FIG. 12.

Figure 12:
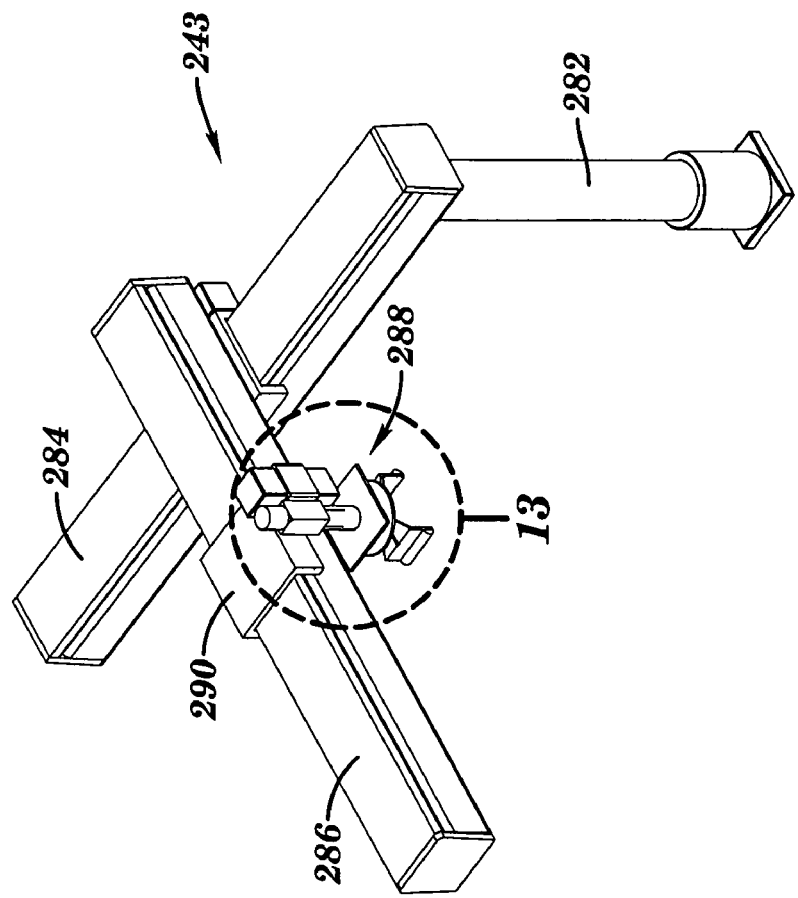
FIG. 12 is a perspective view of a conveyor system according to another aspect of the present invention.

FIG. 12 is a perspective view of the automated gantry-type conveyor system 243 that can be used in one aspect of the present invention. System 243 includes a vertical support post 282, a stationary horizontal support beam 284 mounted to support post 282, a translating horizontal support beam 286 mounted for translation along beam 284, and a motor and gripper assembly 288 mounted for translation along beam 286. In the aspect shown in FIG. 12, motor and gripper assembly 288 is mounted to translation guide 290 that translates along beam 286. Vertical support post 282, stationary horizontal support beam 284, translating horizontal support beam 286, and translation guide 290 are conventional and may be provided by one or more suppliers. In one aspect of the invention, post 282, beam 284, beam 286, and guide 290, and their associated hardware, electrical connections, and actuators, may be provided by Parker Hannifin.

Figure 13:
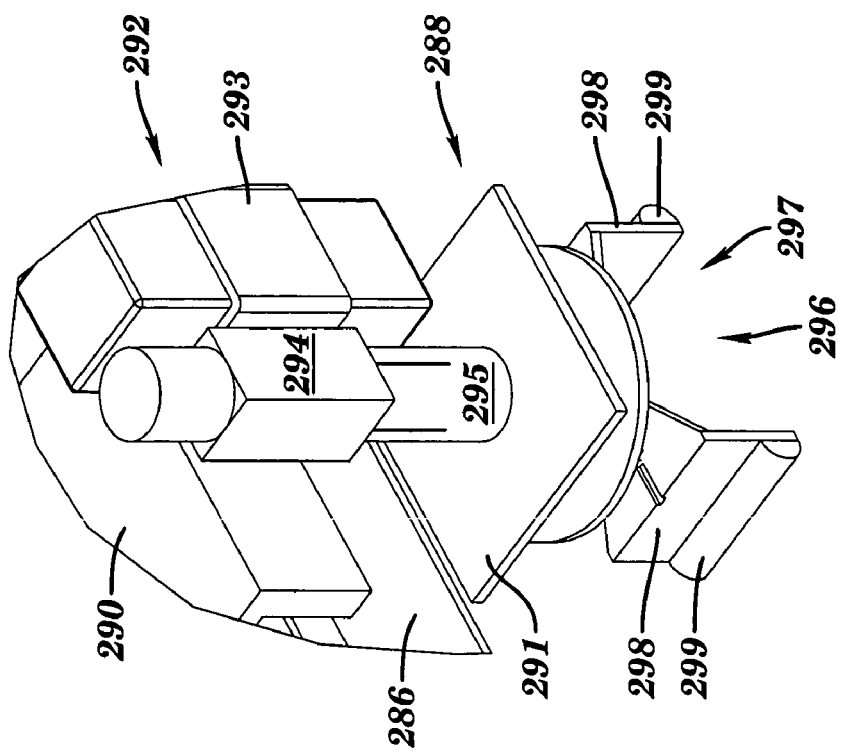
FIG. 13 is a detailed perspective view of an arm-end tooling that can be used with the aspect of the invention shown in FIG. 12.

A detailed perspective view of motor and gripper assembly 288 is shown in FIG. 13. Motor and gripper assembly 288 includes a motor assembly 292 mounted on guide 290 and a gripper sub-assembly 296. Motor assembly 292 includes an electric motor 293, for example, a stepper motor, and an actuator 294, for example, a hydraulic or pneumatic actuator, having a shaft 295. Gripper sub-assembly 296 includes a plate 291 mounted to shaft 295. Gripper assembly 296 includes a linear actuator 297 (not shown), for example, a hydraulic or pneumatic actuator, and a set of opposing gripping arms 298. Each gripping arm 298 may include at least one gripping pad 299, for example, having an elastomeric material, such as polyethylene, to enhance engagement between the gripping arm 298 and the article 201 being grasped. Gripping arms 298 may both translate, or one arm 298 may translate and another arm 298 may be stationary.

According to one aspect of the invention, gantry-type conveyor system 243 having gripper sub-assembly 296 conveys articles, for example, cage bottoms, from conveyor 230, 232, or 237 to staging position 242 shown in FIGS. 9, 10, and 11. The operation of gantry-type conveyor system 243 and gripper assembly 296 are controlled by the automatic control system (not shown) in response to the vision or camera system 241. For example, when handling a cage bottom randomly assembled on conveyor 237, for example, after exiting bedding dispenser 235, the position and orientation of the cage bottom is detected by vision system 241, for example, in a conventional manner. The location and orientation of the cage bottom is processed by the automatic control system and beam 286, guide 290, and motor and gripper assembly 288 are positioned over the desired cage bottom. According to one aspect of the invention, if necessary, the automatic controller rotates shaft 295 of actuator 292 to properly orient the gripping pads 299 of gripping arms 298 essentially parallel to opposite inner surfaces of the cage bottom, for example, essentially parallel with the long side inner surfaces of the cage bottom. According to this aspect of the invention, motor assembly 292 is directed to extend shaft 295, for example, hydraulically, to a position whereby the gripper pads 299 are at an elevation at least partially within the cage bottom. The controller then extends gripping arms 298 by activating linear actuator 297, for example, hydraulically, whereby the gripping pads 299 engage the opposing inner surfaces of the cage bottom to grasp the cage bottom. In one aspect of the invention, gripper arms 298 are contracted about the article, for example, cage bottom. In response to instructions received from the automatic controller, conveyor system 243 then transfers the grasped cage bottom to staging position 242. In one aspect of the invention, the staging position 242 includes one or more barriers or stops and the conveyor system 243 may place or drop articles 201 on staging position 242 and then drag article 201 until it strikes the barrier or stop. According to one aspect of the invention, the elapsed time from the time the article 201 appears on conveyor 237 and the time the article 201 is placed on staging position 242 is less than 5 seconds. In one aspect of the invention the elapsed time is less than 3 seconds, for example, less than 1 second, that is, the locating and transfer of articles from conveyor 237 to staging position 242 is relatively fast.

According to one aspect of the invention, if the article on conveyor 230, 232, or 237 is so oriented that it cannot be easily engaged by gripper assembly 296, for example, a cage bottom, is inverted, on its side, or excessively disoriented, the automatic controller and vision system 241 will ignore article 201 and the article 201 will be conveyed off of, for example, conveyor 237 and deposited in a dump box (not shown). According to one aspect of the invention, the conveyor 230, 232, or 237 may be momentarily stopped to facilitate the grasping and removal of articles 201, for example, cage bottoms.

According one aspect of the invention, gantry-type conveyor system 243 may position at least 1 article 201 or container 204 on staging position 242 before the article 201 or container 204 are handled further. However, in another aspect of the invention, conveyor system 280 may positions at least 2 or more, typically, at least 4 or more articles 201 in staging position 242 before a plurality of articles 201 are forwarded for further handling, for example, in a group of two or more articles 201.

According to one aspect of the invention, at least two articles 201 may be positioned in staging position 242 and then transferred by transfer conveyor 220 to, for example, first position 208 adjacent conveyor 207. According to one aspect of the invention, the at least two articles 201 may be transferred from staging position 242 to first position 208 by conveyor 220 having an arm-end tool 400 similar to arm-end tool 300 shown in FIGS. 4, 5, and 6. For example, arm-end tool 400 may be used to transfer articles 201 from staging position 242 to first position 208. In another aspect of the invention, an arm end tool 400 may be similar to arm-end tool 300 but without the cage-stripper function. The details of the operation of arm-end 300 were discussed previously with respect to FIGS. 7 and 8, and that previous discussion also applies to the features and operation of conveyor 220 and arm-end tooling 400 shown in FIGS. 9, 10, and 11.

According to still another aspect of the invention, handling system 205 may also include an auxiliary station 250 for handling or otherwise manipulating the articles 201 or containers 204 as they exit washer 210. Auxiliary station 250 is shown in phantom in FIGS. 9, 10, and 11. In one aspect of the invention, auxiliary station 250 may be a filing station, for example, for introducing a solid, liquid, or gaseous substance to articles 201 after they have been cleaned in washer 210. For example, in one aspect of the invention, articles 201 may comprise bottles, for example, water bottles, and auxiliary station 250 may be a water bottle filing station. Auxiliary station 250 may also include an article capping station, for example, a bottle filing and capping station. In one aspect of the invention, filling station 250 may be a bottle filing station, for example, an ACS-100IL-CAP/FILL water filling and capping station provided by Allentown Caging Equipment Co., or its equivalent, though other types of filling stations may be used.

According to the present invention, handling system 205 may pick articles 201 from washer output conveyor 230, conveyor 232, conveyor 237, staging table 242, or any other location in system 205 using conveyor 220 depending upon the processing and handling desired. According to the present invention, conveyor 220 may pick a single article 201 or a plurality of articles 201. Depending upon the type and number of articles 201, the tooling used by conveyor 220 may vary.

According to one aspect of the present invention, the handling system 200 shown in FIGS. 9, 10, and 11 operates as follows. The following discussion assumes that the articles 201 or containers 204 conveyed out of washer 210 and positioned on washer output conveyor 230 comprise cage bottoms and cage bottom pallets. It will be apparent to those skilled in the art that this discussion can apply to other articles 201 and containers 204. According to one aspect of the invention, the cage bottoms are inverted and arranged haphazardly on output conveyor 230. As the cage bottoms emerge from washer 210, output conveyor 230 transfers the cage bottoms over the edge of output conveyor 230 and through height 231 (see FIG. 11) whereby the cage bottom flips over as the cage bottom lands on conveyor 232. Conveyor 232 then transports the cage bottom, having its open side directed upward, through bedding dispenser 235 where the cage bottom is at least partially filled with an appropriate bedding, for example, pine chips. The cage bottom having bedding then emerges from bedding dispenser 235 onto conveyor 237. The cage bottom is removed from conveyor 237 by means of conveyor 243 (see FIG. 12). With the aid of camera system 241 and an automated control system, conveyor system 243 positions gripper assembly 296 and grasps the cage bottom and transfers the cage bottom from conveyor 237 to staging position 242. As discussed previously, if the cage bottom is inverted or on its side, among other undesirable positions, conveyor system 240 may ignore the cage bottom allowing it to be conveyed off of conveyor 237 and deposited, for example, in a bin (not shown). The contents of the bin may be removed at a later time as needed.

According to one aspect of the invention, at least one, typically at least two, and preferably at least four, cage bottoms are arranged by conveyor 243 onto staging position 242 where they can be further handled by conveyor 220 having tool 400. According to one aspect of the invention, after conveyor system 240 assembles one or more cage bottoms on staging position 242, conveyor 220 grasps the one or more cage bottoms, as described with respect to FIGS. 12, 13, and 14, and conveys the one or more cage bottoms to first position 208, for example, to a pallet on conveyor 207. As shown in FIGS. 9 and 10, conveyor 207 may be a conveyor having two belts upon which articles 201 and containers 204 may be conveyed. For example, in one aspect of the invention articles 201, for example, bottles, may be conveyed on one conveyor while a container 204, for example, a bottle basket, may be conveyed simultaneously on the other conveyor of conveyor 207.

The type, quantity, height, or other characteristic of the accumulated cage bottoms in first position 208 may be detected by sensor trees 213. When sensor trees 213 detect that the number of cage bottoms assembled in first position 208 reaches a predetermined height or number, the automatic control system activates one or more conveyors 207 and transfers the pallet having the stacked cage bottoms to second position 206, for example, having lift table 211 and cart 202. The pallet and cage bottoms are then transferred from conveyor 207 to cart 202 by the lift table 211. The cart 202 having the pallet and cage bottoms may then be transferred, for example, manually or automatically, to further handling, processing, or storage as desired. According to one aspect of the invention, a series of pallets having cage bottoms may be lined up on conveyors 207.

If system 200 includes an auxiliary handling station 250, for example, a bottle filing station or further cage bottom treatment or handling, conveyor 220 may first convey the bottles or cage bottoms to handling station 250 and, after handling, transfer the bottles or cage bottoms to first position 208.

According to another aspect of the invention, a container 204, for example, a pallet, may emerge from washer 210 on conveyor 230 and be transferred by conveyor 220 using tooling 400 from conveyor 230 to first position 208. For example, to await subsequent loading with cage bottoms as described above. Container 204 may be handled be gripper arms 330, as shown in FIGS. 4, 5, and 6.

Figure 14:
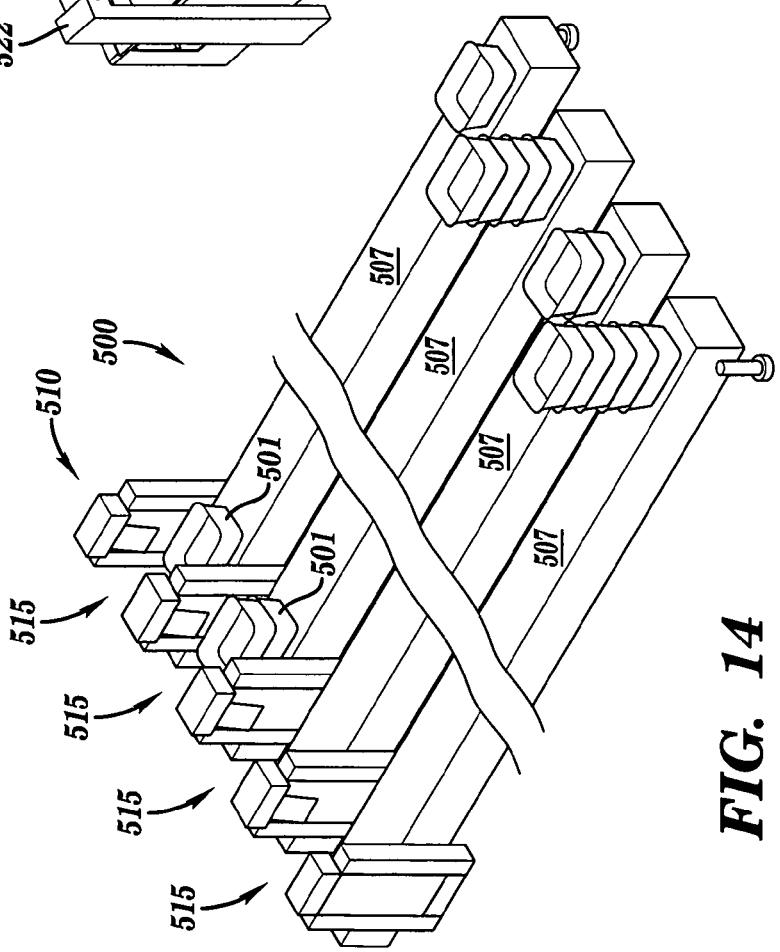
FIG. 14 is a perspective view of a conveyor system and article handling mechanism according to another aspect of the present invention.

FIG. 14 is a perspective view of a conveyor system 500 with an article handling mechanism 510 according to another aspect of the present invention. Conveyor system 500 and handling mechanism 510 may be used, for example, in either handling system 100 or 200 discussed above or in a similar handling system, or may be used separately to handle articles 501. As in systems 100 and 200, handling system 500 may be used to handle a variety of articles 501, including, for example, containers, trays, utensils, bottles, jars, tools, pallets, and cages, for example, mouse, rat, or rabbit cages, and the like. In one aspect of the invention, articles 501 handled by system 500 are those articles associated with laboratories which handle living specimens, for example, mice and rats, and may include animal cages and animal cage components, for example, cage bottoms, cage tops, feeding bottles, bottle caps, and the like. In the aspect of the invention shown in FIGS. 14-16, for illustrative purposes, articles 501 comprise mouse cage bottoms, though other types of articles identified may be handled by system 500.

Figure 15:
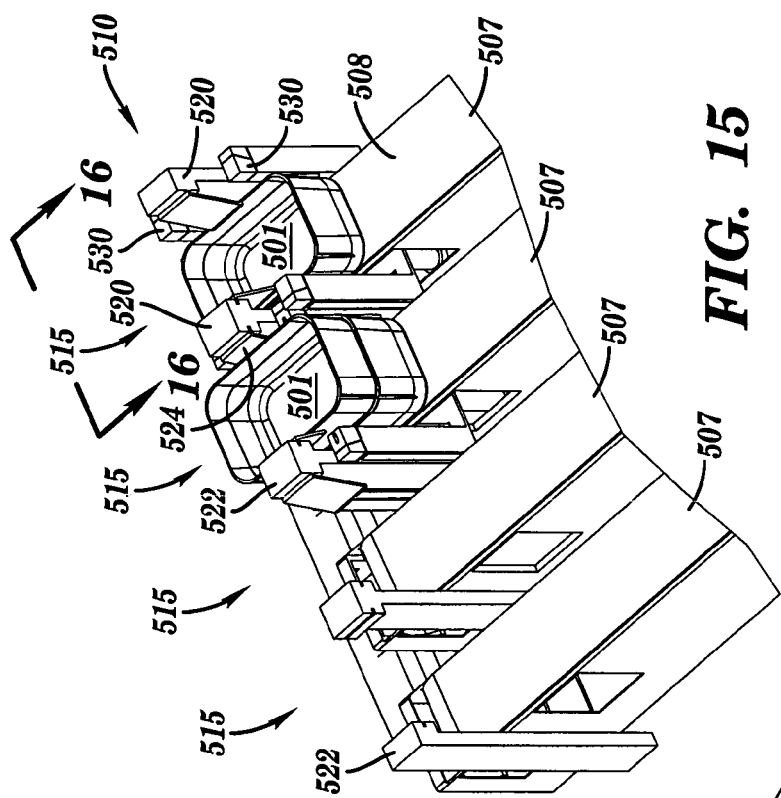
FIG. 15 is a detailed perspective view of the article handling mechanism shown in FIG. 14.
Figure 16A:
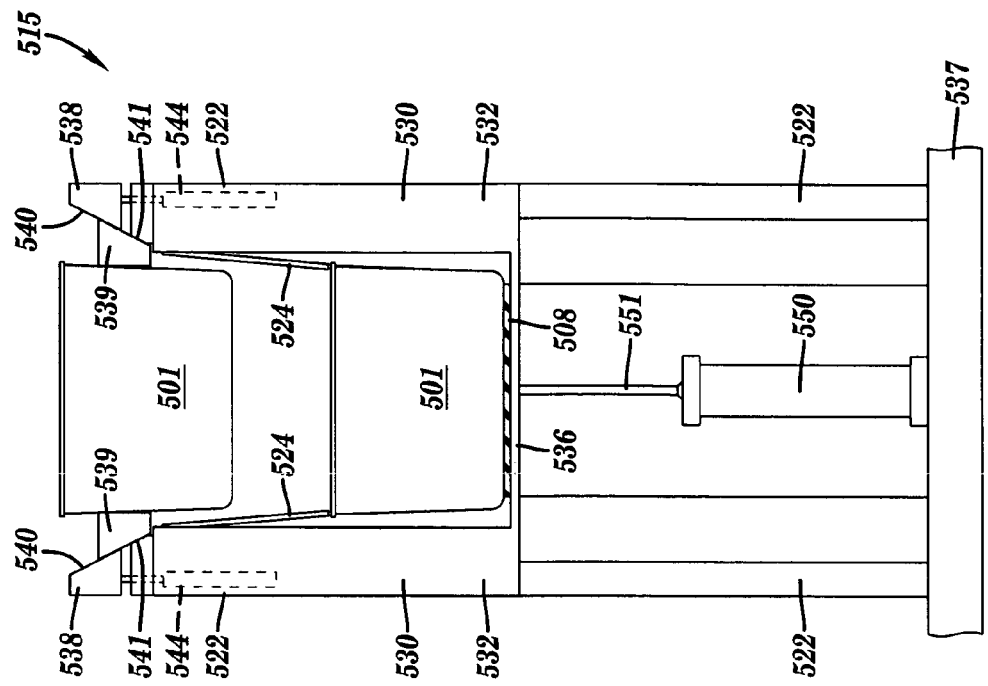
FIGS. 16A and 16B are detailed elevations views of the article handling mechanism shown in FIG. 15 as viewed along lines 16-16.
Figure 16B:
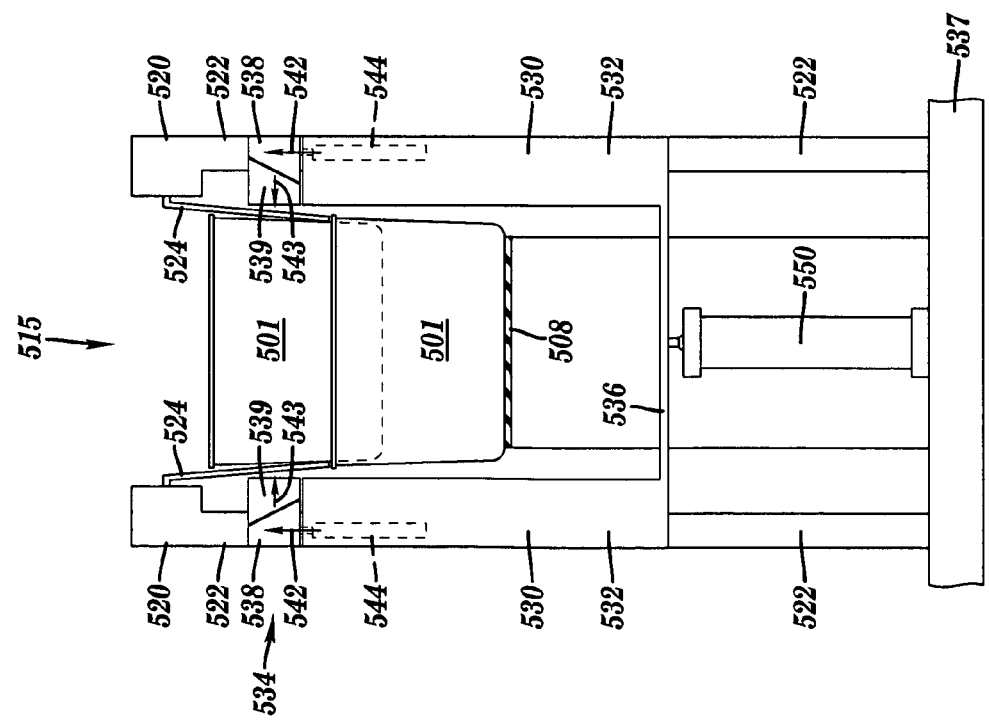

System 500 includes at least one conveyor 507, for example, a plurality of conveyors 507. Conveyor 507 may be any conventional conveyor, but in one aspect of the invention, conveyor 507 comprises a belt-type conveyor similar to or identical to belt conveyors 107 or 207 discussed above, or their equivalent, having a conveyor belt 508. According to this aspect of the invention, system 500 includes an article handling mechanism 510 comprising at least one subsystem 515. Though four subsystems 515 are displayed in FIG. 14, system 500 may include one or more subsystems 515, for example, at least 2 or more subsystems 515. According to this aspect of the invention, handling mechanism 510 is adapted to handle at least two articles 501, for instance, at least two stacked and nested articles 501, transferred to handling mechanism 510 by conveyor 507. In particular, handling system 510 is adapted to separate at least the bottom-most article in a set of stacked and nested articles 501 whereby the at least the bottom-most article may be isolated for individual handling and transferring for further handling. In one aspect of the invention, handling mechanism 510 may be adapted to separate a plurality of the bottom-most articles 501, for example, at least two of the bottom-most articles 501, for further handling and transferring. FIG. 15 provides a detailed perspective view of the article handling mechanism 510 and the subsystems 515 shown in FIG. 14. FIGS. 16A and 16B are detailed elevations views of one of the subsystems 515 shown in FIGS. 14 and 15 as viewed along lines 16-16 in FIG. 15. FIG. 16A illustrates subsystem 515 when subsystem 515 is in the inactivated or lowered position and FIG. 16B illustrates subsystem 515 when in the activated or raised position.

As shown in FIGS. 15, 16A, and 16B, according to this aspect of the invention, handling system 510 includes at least one subsystem 515, for example, two, three, four, or more subsystems 515, for handling articles 501 transferred to subsystems 515 on conveyor belt 508 (shown in cross-section in FIGS. 16A and 16B) of conveyor 507. Each subsystem 515 includes at least one stripping assembly 520 and at least one gripping assembly 530. In one aspect of the invention, adjacent subsystems 515 may include stripping assemblies 520 and gripping assemblies 530 mounted on the same support structures. According to this aspect of the invention, stripping assembly 520 comprises a stripper mounting structure 522 mounted to a support structure 537, for example, a concrete floor, an overhead ceiling, or an adjacent wall, and at least one stripper 524 mounted to stripper mounting structure 522. Mounting structure 522 may be any type of structure, for example, a beam, a bar, a tube, a block, etc., adapted to rigidly support stripper 524. Stripper mounting structure 522 may be metallic, for example, carbon steel, stainless steel, or aluminum, among other metals; or plastic, for example, high-density polyethylene or a polyvinyl chloride (PVC) plastic. In the aspect of the invention shown in FIGS. 14-16B, stripper mounting structure 522 comprises a vertical aluminum or stainless steel column mounted to a floor of the facility, for example, rigidly mounted by means of mechanical fasteners.

According to one aspect of the invention, stripper 524 comprises any structure mounted to mounting structure 522 that can be adapted to impact one or more articles 501 to deflect or "strip" at least one article 501 from another article 501. Stripper 524 may be metallic, for example, carbon steel, stainless steel, or aluminum, among other metals; plastic, such as polyethylene, polypropylene, polyester, or polytetraflouroethylene (PTFE), among other plastics; or elastomeric, for example, a rubber material such as neoprene or EPDM. Stripper 524 may be mounted to mounting structure 522 by conventional means, for example, mechanical fasteners. According to the aspect of the invention shown in FIGS. 14-16B, stripper 524 comprises at least one metallic, plastic, or elastomeric projection mounted to the top of mounting structure 522 and formed to be directed in a downward direction. In one aspect of the invention shown, stripper 524 comprises at least two oppositely mounted elastomeric projections or flaps. For example, in the aspect of the invention shown in FIGS. 16A and 16B, stripper 524 comprises two elastomeric projections mounted to mounting structures 522 whereby the elastomeric projections have an inner surface that makes an angle of between about 5 to about 60 degrees with the vertical in the unloaded or undeflected condition.

According to one aspect of the invention, gripper assembly 530 comprises at least support structure 532 having at least one gripping mechanism 534. In one aspect of the invention, the at least one support structure 532 comprises a moveable support structure, for example, a moveable column, tube, or shaft. The at least one support structure 532 may be mounted to a support member 536, for example, a plate, bar, or beam, whereby the support structure 532 and support member 536 are moveable, for example, translatable in the vertical direction. As shown in FIGS. 14-16B, gripper assembly 530 may comprise at least two support structures 532, for example, at least one set of two oppositely positioned support structures 532. Gripping mechanism 534 may be any type of mechanism adapted to grasped at least one article 501, for example, at least one cage bottom, whereby article 501 can be moved when support structure 536 and column 532 are moved. In the aspect of the invention shown in FIGS. 14-16B, gripping mechanism 534 comprises at least one set of camming blocks 538, 539. Camming blocks 538, 539 including corresponding camming surfaces 540, 541, respectively. Camming blocks 538, 539 may be metallic, for example, stainless steel, or non-metallic, for example, polyethylene plastic.

According to this aspect of the invention, external camming blocks 538 are mounted for vertical displacement, as indicated by arrows 542 in FIG. 16A, and internal camming blocks 539 are mounted for horizontal displacement, as indicated by arrows 543 in FIG. 16A. According to this aspect of the invention, as camming blocks 539 horizontally displace, the internal surface of camming blocks 539 engage the external surface of the adjacent article 501, for example, the external surface of cage bottom. In one aspect of the invention, camming blocks 539 operate in tandem and retain adjacent article 501 between the pair of inward translating camming blocks 539. External camming blocks 538 are operatively connected to a means for vertically displacing camming block 538. As shown in FIGS. 16A and 16B, one means of vertically displacing camming block 538 may comprise a cylinder 544, for example, a hydraulic or pneumatic cylinder, for instance, a cylinder having a shaft connected to camming block 538 by conventional means. Other means of displacing camming block 538 may comprise electric solenoids, stepper motors, and mechanical linkages, among other conventional means. The displacement of camming block 538 may be supported by some form of bearing or guide means (not shown). Internal camming blocks 539 are deflected due to the interaction of surfaces 540, 541 when camming blocks 538 are vertically deflected. Though surfaces 540, 541 are shown as linear, planar surfaces, surfaces 540, 541 may be non-linear, for example, circular, parabolic, or hyperbolic. In the aspect of the invention shown in FIGS. 14-16B, camming surfaces 540, 541 are linear, planar surfaces which make an angle between about 15 degrees and about 75 degrees with the vertical, for example, an angle between about 30 degrees and about 60 degrees with the vertical. According to one aspect of the invention, camming blocks 539 may be displaced by other means not employing camming blocks 538, for example, by means of a hydraulic or pneumatic cylinders, electric solenoids, stepper motors, and mechanical linkages, among other means. Though in the discussion above both camming blocks 539 deflect to engage an article 510, in one aspect of the invention, only one of the camming blocks may deflect to engage article 501 between the deflecting camming block 539 and a stationary surface. The displacement of camming block 539 may also be supported by some form of bearing or guide means (not shown). In one aspect of the invention, internal camming blocks 539 may include at least some resilient material (not shown) on their inner surfaces to protect the article 501 being grasped, for example, an elastomeric or plastic material, such as neoprene foam rubber or its equivalent. The resilient material may be mounted to camming blocks 539 by conventional means, for example, by means of adhesives or mechanical fasteners.

In one aspect of the invention, camming blocks 538 may comprise rotatable cams instead of translatable blocks, for example, camming blocks 538 may comprise one or more lobes on one or more horizontal or vertical cam shafts, driven by appropriate drive means, for example, a stepper motor, to horizontally deflect camming blocks 539.

According to this aspect of the present invention, once the camming blocks 539 are extended and engage adjacent article 501 (which is positioned above the lower-most article 501), the gripping mechanism 534, support structure 532, and support member 536, may be raised whereby article 501 engaged by camming blocks 539, and any articles 501 above article 501 engaged by camming blocks 539, are separated from at least the lowest-most article 501. This physical separation of the articles above at least the lowest-most article 501 permits at least the lowest-most article 501 to be separated from the remainder of articles 501 and handled individually. This separation of at least the lowest-most article 501 may be effected by means of conveyor 507 or by means of any other conveyor or handling device adapted to remove at least the lowest-most article 501 from beneath the other articles 501 grasped and raised by subsystem 515.

According to this aspect of the invention, at least gripping mechanism 534 is raised by any conventional means. In one aspect of the invention, gripping mechanism 534, support structure 532, and support member 536 are raised by any conventional means. For example, as shown in FIGS. 16A and 16B, one or more of these structures and the grasped articles may be raised by means of at least one hydraulic or pneumatic cylinder 550 having a connecting rod 551 adapted to deflect support member 536, for example, by means of mechanical fasteners, though rod 551 may not be rigidly mounted to support member 536. Cylinder 550 may be mounted to lower support structure 537 or to another fixed structure. According to other aspects of the invention, at least the gripping mechanism 534 may be raised by other means, including by means of two or more cylinders 550 acting in tandem mounted beneath gripping mechanism 534 or support structures 532. According to another aspect of the invention, at least the gripping mechanism 534 may be raised by means of one or more cam shafts positioned adjacent to or below gripping mechanism 534, support structure 532, or support member 536. According to the this aspect of the present invention, at least gripping mechanism 534 is raised sufficiently so that at least the lowest-most article can be removed from the one or more articles lifted by the lifting mechanism. In one aspect of the invention, the gripping mechanism 534 is raised at least about 3 inches, for example, at least about 6 inches.

With reference to FIGS. 16A and 16B, the subsystem 515 operates as follows. The following discussion assumes articles 501 being handled by subsystem 515 are animal cage bottoms, for the sake of illustration. It will be clear to those of skill in the art that other types of articles may also be handled in a similar manner. According to this aspect of the present invention, a stacked and nested set of articles 501 is transferred to at least one subsystem 515 by means of conveyor 507 having conveyor belt 508. The position of the nested articles 501 in subsystem 515 may be defined by one or more mechanical stops (not shown) positioned to limit the movement of articles 501 or by means of one or more sensors (not shown) located in the vicinity of subsystems 515. In one aspect of the invention, the height or number of stacked articles 501 may also be determined by means of one or more sensors. According to this aspect of the invention, after the stacked cage bottoms are positioned within a subsystem 515, gripping mechanism 534 is activated either manually or automatically whereby inner camming blocks 539 are extended and engage the sides of, for example, the next-to-lowest cage bottom. With the cage bottom grasped by gripping mechanism 534, gripping mechanism 534 is then raised to displace the next-to-lowest cage bottom from lowest cage bottom. As shown in FIGS. 14-16B, gripping mechanism 534 is raised with support structure 532 and support member 536 by means of one or more cylinders 550. Again, the next-to-lowest cage bottom is typically raised whereby the lowest cage bottom can be removed from beneath the next-to-lowest cage bottom and any cage bottoms stacked in the next-to-lowest cage bottom.

According to this aspect of the invention, should the lowest cage bottom not separate from the next-to-lowest cage bottom, the lowest cage bottom may impact the cage stripper 524 that deflects and separates the lowest cage bottom from the next-to-lowest cage bottom. For example, the lower edge of the stripper projection 524 may strike the upper rim of the lowest cage bottom as the lowest cage bottom is raised with the next-to-lowest cage bottom and separates the cage bottoms whereby the lowest cage bottom remains on conveyor belt 508 for further handling, for example, removal. After the lowest cage bottom is further handled, for example, removed from beneath the other cage bottoms, gripper mechanism 534 and any adjacent structures are lowered to place the one or more remaining cage bottoms on conveyor belt 508, for example, by cylinder 550, and gripper mechanism 534 may be disengaged. Gripper mechanism 534 is then raised to a level adjacent the new next-to-lowest cage bottom and the process is repeated, as necessary. According to one aspect of the invention, one or more sensors are provided to determine whether further separation of cage bottoms is necessary, for example, to determine when only a single cage bottom is present within subassembly 515 and no further separation is necessary.

Figure 17:
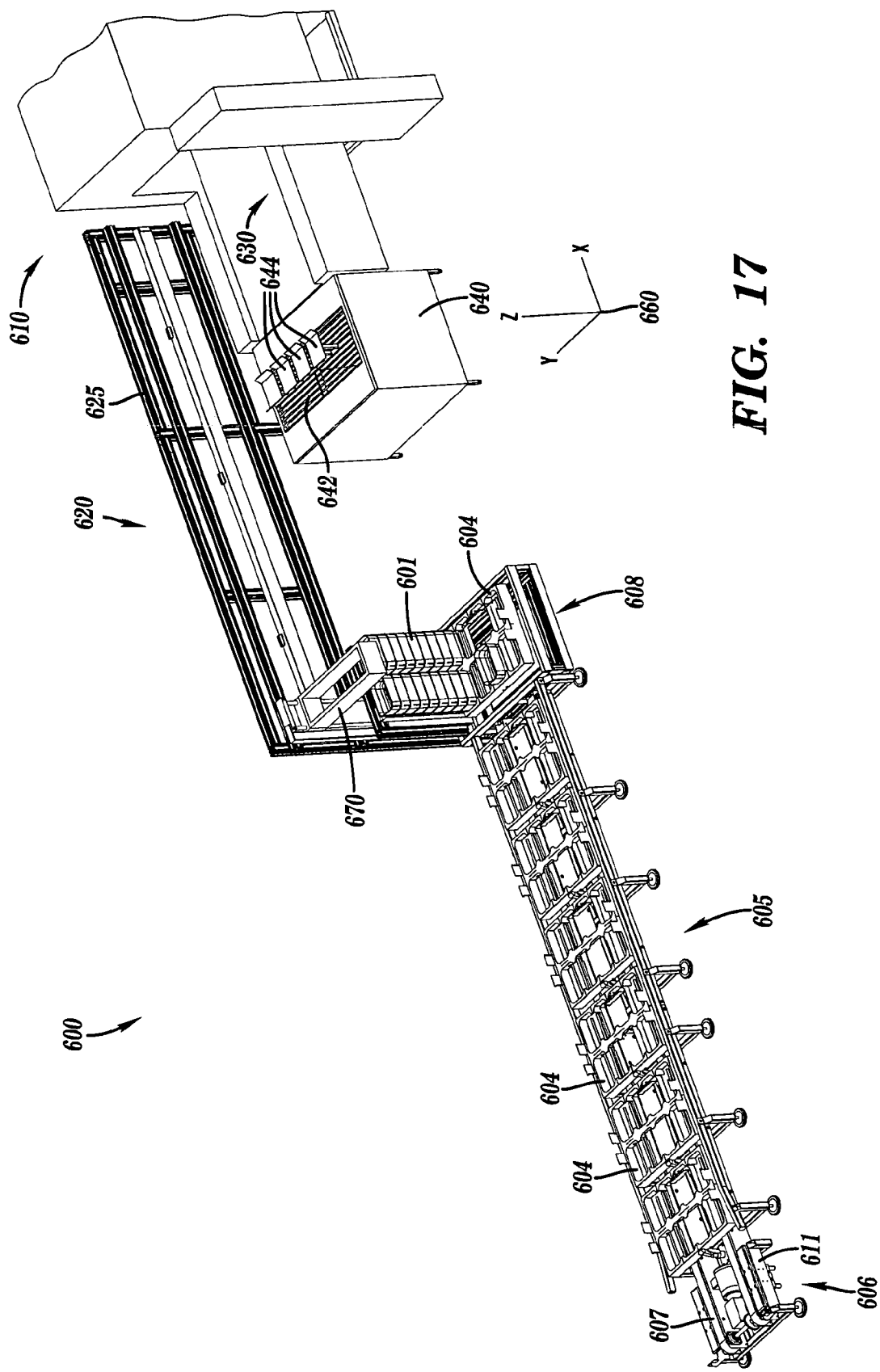
FIG. 17 is a left-hand perspective view of another handling system for feeding articles to an automatic washer according to one aspect of the invention.

FIG. 17 is a left-hand perspective view of another handling system 600 for feeding articles to an automatic washer according to one aspect of the invention. Handling system 600 includes a feeding system 605 that introduces articles 601 or containers 604 to an automatic washer 610. Articles 601 and containers 604 may be substantially similar or identical to articles 101 and containers 104 described above. Again, handling system 600 may be marketed under the name Mack Animal Cage Handling (MACH) System by Mack Design, Inc. As discussed above, with respect to system 100 shown in FIGS. 1, 2, and 3, as will be recognized by those familiar with the materials handling art, aspects of the present invention shown in FIG. 17 may also used to handle articles for processing other than washing. For example, aspects of the present invention may be used to handle and introduce articles for many types of processing or material handling, including inventory control and retrieval, food processing, machining, fabrication, and assembly facilities, and sorting, orienting, and stacking facilities, among many others.

Washer 610 may be any type of conventional washer system, for example, a tunnel-type washer as discussed previously. In one aspect of the invention, washer 610 may be an indexing-type tunnel washer. In another aspect of the invention, washer 110 may be a continuous-flow tunnel washer, for example, a MTP 3236 tunnel washer provided by Getinge Inc. of Rochester, N.Y., though other types of washers may be used with aspects of the present invention.

The aspect of the invention shown in FIG. 17, a single-line system having a single feeding system 605 feeding a single washer 610. However, aspects of the present invention may comprise one or more lines for handling and washing. For example, in one aspect of the invention, two or more feeding systems 605 may feed two or more washers 610. In another aspect of the invention, two or more feed systems 605 may feed one or more washers 610.

Though not shown in FIG. 17, articles 601 may be introduced to system 600 by means of a cart, for example, by means of cart 102 shown and described with respect to FIG. 1 above. A cart, such as cart 102, may transport individual articles 601 or may transport articles 601 mounted in containers 604, for example, on a pallet, tray, box, or similar container. In one aspect of the invention, articles 601 may be transported to system 600 by means of a UniMac™ material handling cart as disclosed in co-pending U.S. application Ser. No. 10/071,323 discussed above.

According to one aspect of the present invention, feeding system 605 includes one or more infeed conveyors 607, for example, belt conveyors, for transferring articles 601 to be washed from a first position, or loading position, 606 to a second position, or "pick position", 608. In the aspect of the invention shown in FIG. 17, one or more conveyors 607 may be MACH CONV 450 conveyors provided by Mack Design Inc., though other types of conveyors may be used. Conveyors 607 may include a single belt or a plurality of belts, for example, two belts as shown in FIG. 17.

According to one aspect of the invention, the loading position 606 may include sensors that, among other things, detect the presence of a cart (not shown, for example, cart 102), the type of cart, and the contents of the cart. The sensors located in loading position 606 may be located on one or more sensor support structures (not shown), for example, a structure referred to in the art as a "sensor tree", such as sensor tree 113 shown in FIG. 1. The sensor tree may include electromechanical actuators and sensors as described above for sensor tree 113.

As shown in FIG. 17, articles 601 may be introduced to conveyors 607 manually or by automated means. In one aspect of the invention, articles 601 may be removed from a cart (not shown) automatically by means of a lift table 611. Lift table 611, for example, a MACH LIFT 450 lift table, provided by Mack Design, Inc., may be activated manually or automatically, to lift an article 601, or a container 604, for example, a pallet, containing one or more articles 601, and place article 601 or container 604 on conveyor 607. After articles 601 or container 604 are removed from the cart, the cart may be removed from loading position 606, for example, manually or automatedly, and replaced with another cart for subsequent unloading. Conveyor 607 may also be activated manually or automatically. For example, conveyor 607 may be activated by the operator pressing an activation button or conveyor 607 may be activated automatically when the cart is positioned in loading position 606 or when articles 601 or containers 604 are removed from the cart 102, among other triggering events, for example, as detected by one or more sensors on a sensor tree (not shown).

Conveyor 607 transfers articles 601 or containers 604 from loading position 606 to pick position 608. As shown in FIG. 17, one or more conveyors 607 may include side rails or similar structures, which assist in preventing the articles 601 or containers 604 from falling off conveyors 607. Conveyors 607 may also include a restraining barrier or stop to limit the forward movement of articles 601 or containers 604 when they are transported to pick position 608. In one aspect of the invention, pick position 608 may include at least one sensor, for example, at least one optical or electromagnetic sensors (not shown) for detecting the present of articles 601 or container 604 in the pick position 608. In another aspect of the invention, the detection of the presence of articles 601 or containers 604 may actuate an electromechanical stop or barrier that prevents subsequent articles 601 or container 604 from accessing pick position 608. According to one aspect of the invention, a plurality of articles 601 or containers 604, may be lined up on conveyor 607 as shown in FIG. 17 awaiting subsequent handling and processing. In the aspect of the invention shown in FIG. 17, conveyor 607 is shown having a length long enough to accommodate six pallets 604; however, according to aspects of the invention, the length of conveyor 607 and the number of pallets 604 or articles 601 that may be mounted on conveyor 607 may vary broadly, for example, depending on desired queue time or the desired overall length of the room into which system 600 is installed.

In one aspect of the invention, the system 600 may also include a sensor tree or "pick-up sensor tree", located in, near, or adjacent to pick position 608, such as sensor tree 115 described above.

According to one aspect of the present invention, articles 601 or containers 604 may be transported from pick position 608 to washer 610 by means of conveyor system 620. Conveyor system 620 may be any conveyor system that can transport articles 601 or containers 604 from pick position 608 to washer 610. Conveyor system 620 may be mounted to a support structure or framework 625. Support structure 625 may be an integrated, floor- or wall-mounted frame system that supports and positions conveyor system 620. Support structure 625 may be made from conventional structural members, such as structural tubing, framing, or beams, or from extruded framing and accessories provided by the company 80/20 Incorporated, or their equivalent.

In the aspect of the invention shown in FIG. 17, conveyor system 620 may comprise a linear actuator, for example, a shuttle-type linear actuator, for instance, a BMLA Linear Actuator provided by the Daedal Division of Parker Hannifin Corporation, though other types of linear actuators may be used. In one aspect of the invention, conveyor system 620 may be referred to as a "power rail," for example, a cylinder driven linear actuator. In one aspect, the actuator cylinder may be driven pneumatically, hydraulically, or electronically. The cylinder may be include one or more rods or be rodless.

In one aspect of the invention, conveyor system 620 comprises a multi-axis conveyor system, for example, the conveyor system may be a double-axis conveyor system that is adapted to translate articles 601 or containers 604 in the X and Z directions as shown by coordinate axes 660 shown in FIG. 17. In another aspect of the invention, conveyor system 620 may be a triple-axis conveyor system, for example, a conveyor system that is adapted to translate articles 601 or containers 604 in the X, Y, and Z directions as shown by coordinate axes 660. In the aspect of the invention shown in FIG. 17, conveyor system 620 comprises a two-axis shuttle-type system having at least one arm-end tool 670 which is adapted to transfer articles 601 or containers 604 from pick position 608 to washer 610. Arm-end tool 570 may be similar to arm-end tool 300 shown in FIGS. 4, 5, and 6 above. Though only a single lines is shown in FIG. 17, in one aspect of the invention, two or more conveyor 607 and two more washers 610 may also be used, for example, requiring only a two-axis or three-axis conveyor 620.

The multi-axis conveyor system 620 shown in FIG. 17, includes a conventional electronic and hydraulic control system, drive motors, drive shafts, bearings, power cables, hydraulic or pneumatic hoses, cable trays, and related items that are conventionally supplied with such systems. Some structures and components are not illustrated in FIG. 17 to facilitate illustration and discussion of this aspect of the invention.

As shown in FIG. 17, according to one aspect of the present invention, washer 610 includes at least one input location 630, for example, a belt conveyor, for introducing one or more articles 601 or container 604 to washer 610. According to one aspect of the present invention, conveyor system 620 transports one or more articles 601 from pick position 608 to input location 630. In one aspect of the invention, where articles 601 comprise an open top, for example, cage bottoms, conveyor system 620 positions articles 601 wherein the open top of articles 101 are placed face down on input location 630. According to one aspect of the invention, when input location 630 comprises a belt conveyor, the belt conveyor may be operated continuously or intermittently, for example, whereby articles 601 may be positioned on input location 630 by conveyor system 620 while the conveyor belt is stationary or while the belt is in motion.

According to one aspect of the invention, the system 600 may also include one or more waste collectors or dust control units 640, for example, having a screen or grill 642. In this aspect of the invention, prior to placing articles 601 on input location 630, conveyor system 620 may dump the contents of articles 601, for example, waste bedding, into waste collectors 640. For example, in one aspect of the invention, conveyor system 620 may invert articles 601 containing waste, for example, a cage bottom containing bedding, above a waste collector 640 whereby the waste falls into waste collector 640. In another aspect of the invention, conveyor system 620 may place the inverted article above or on a grill 642 of waste collector 640 and agitate article 601 or strike grill 642 with article 601 to assist in discharging any waste from article 601. In another aspect of the invention, one or more mechanical agitators or scrapers 644 may be mounted above waste collectors 640 and the scrapers 644 can be used to physically dislodge any waste material that is not dislodged by simply overturning the article, for example, a cage bottom. In one aspect of this feature of the invention, the mechanical scrapers 644 may comprise projections or "fingers", for example, projections having plastic or rubber tips, over which the open end of article 601 is positioned. The one or more projections may be moved within the stationary article 601, or article 601 may be moved relative to the one or more stationary projections. In one aspect of this feature, both the article and the projection may be moved to assist in removing any stubborn waste from article 601. According to one aspect of this feature, the scrapers 644 may comprise a scraper system provided by Mach Design Inc., or its equivalent. In one aspect of the invention scrapers 644 comprises a plastic material, an elastomeric material, or a composite material, for example, to minimize damage to the article being handled. Though not shown in FIG. 17, the discharging of waste from articles 601 may also be assisted by directing a stream of fluid, for example, water or air, into article 601.

According to another aspect of the invention, handling system 605 may also include an auxiliary article handling station (not shown), for example, an auxiliary article handling station 150 shown and described with respect to FIG. 1. For example, in one aspect of the invention, articles 601 may comprise containers having covers, lids or stoppers, for example, bottles having lids, and auxiliary handling station may be a cover, lid, or stopper removal and container emptying station. In one aspect of the invention, the handling station may comprise a bottle washing or bottle dumping station, for example, an ASC-100IL-UC uncapping and dumping system provided by Allentown Caging Equipment Co., or its equivalent. According to one aspect of the invention, after the articles, for example, bottles and bottle caps are handled in the handing station, conveyor 620 may be used to transport articles 601 from the handling station to washer 610.

Other than the difference in conveyor system 620 from conveyor system 120, handling system 600 shown in FIG. 17 operates in substantially the same manner as handling system 100 shown in FIGS. 1, 2, and 3.

Figure 18:
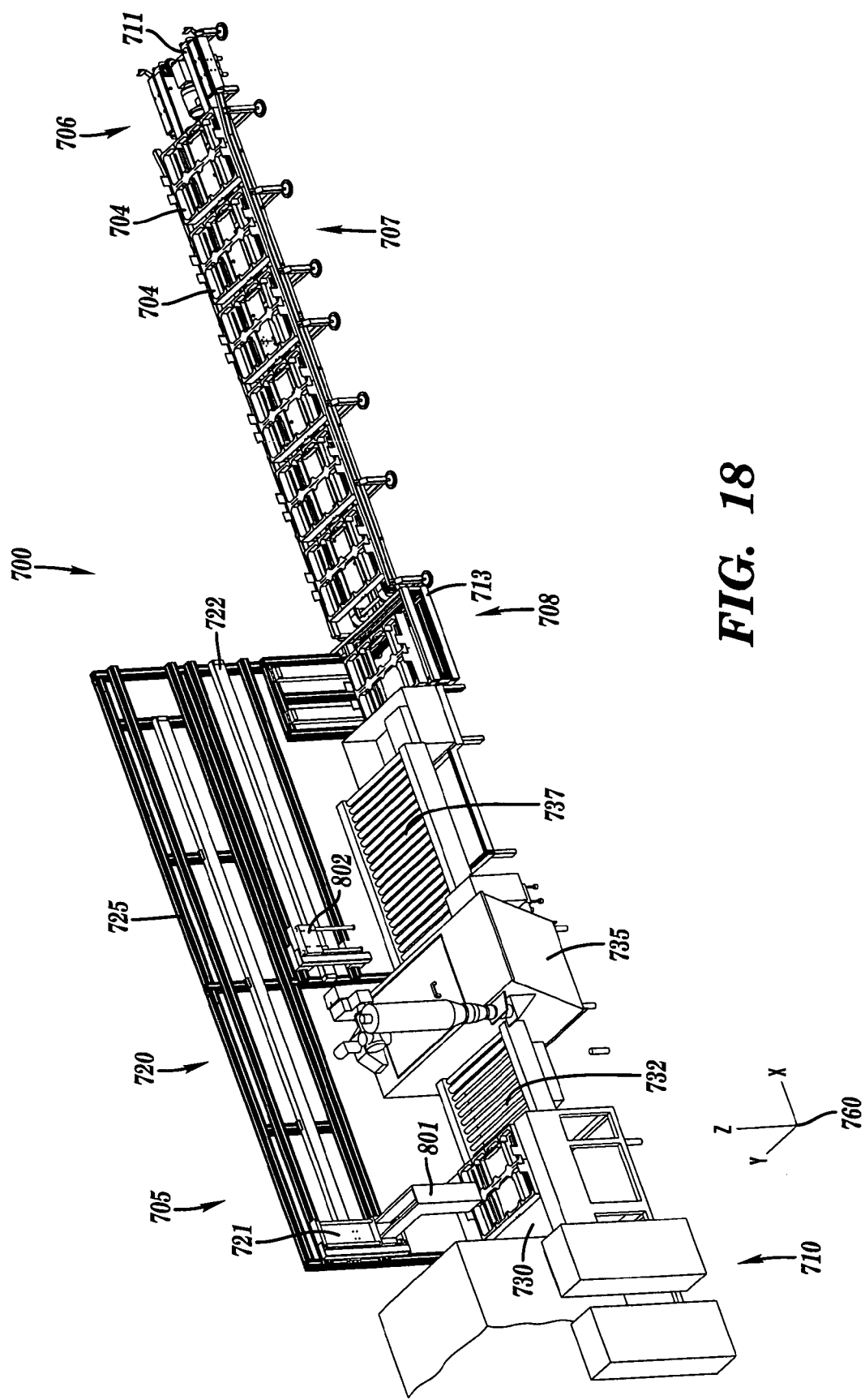
FIG. 18 is a left-hand perspective view of another handling system for discharging articles from an automatic washer according to one aspect of the invention.

FIG. 18 is a left-hand perspective view of another handling system 700 for discharging articles from an automatic washer according to one aspect of the invention. Handling system 700 includes an unloading system 705 that removes washed articles 701 or containers 704 from a washer 710, for example, the same washer 610 described with respect to FIG. 17. Unloading system 705 may include one or more conveyor systems 707, for example, belt conveyor systems, and one or more conveyor systems 720, for example, a shuttle-type conveyor system. Handling system 700 may also be marketed under the name Mack Animal Cage Handling (MACH) System by Mack Design, Inc.

The types of articles 701 and containers 704 that may be handled by system 700 may be substantially the same as the articles 101 and containers 104 discussed with reference to FIGS. 1, 2, and 3. As discussed above, with respect to system 100 shown in FIGS. 1, 2, and 3, as will be recognized by those familiar with the materials handling art, aspects of the present invention shown in FIG. 18 may also used to handle articles for processing other than washing. For example, aspects of the present invention may be used to handle and introduce articles for many types of processing or material handling, including inventory control and retrieval, food processing, machining, fabrication, and assembly facilities, and sorting, orienting, and stacking facilities, among many others.

According to one aspect of the present invention, washer 710 discharges articles 701 or containers 704 to at least one output location 730, for example, a belt conveyor from washer 710. Typically, washer 710 directs water in an upward direction as the articles 701, for example, overturned cage bottoms or bottles, are transported through washer 710 on a fluid permeable, perforated conveyor belt. As a result, articles 701 and containers 704 may typically be arranged in a haphazard manner as they emerge from washer 710 on output location 730. According to one aspect of the invention, when output location 730 comprises a belt conveyor, the belt conveyor may be operated continuously or intermittently, whereby washed articles 701 or containers 704 may be unloaded while the conveyor belt is stationary or while the belt is in motion.

In one aspect of the invention, washed articles 701 or containers 704 may be removed from output location 730 by conveyor system 720 and transported to a first position 708 adjacent to belt conveyor 707, for example, a belt conveyor similar to conveyor 107 discussed with respect to FIGS. 1, 2, and 3. For example, single articles 701 or containers 704, for example, pallets or baskets, may be transported directly from output location 730 to first position 708 by conveyor system 720. According to one aspect of the invention, the conveyor 730 may be momentarily stopped to facilitate the grasping and removal of articles 701, for example, when handling a cage bottom pallet.

In one aspect of the present invention, conveyor system 720 may include at least one of a first conveyor 721 and a second conveyor 722. First and second conveyors 721 and 722 may comprise linear actuators, for example, similar to conveyor 620 described with respect to FIG. 17. In one aspect, conveyors 721 and 722 may be linear actuators adapted to have arm-end tooling 801 and 802, respectively, mounted thereon, such as arm-end tooling 300 discussed above. Conveyor system 720 may be mounted on a support structure 725 which supports and positions conveyors 721 and 722. Support structure 725 may be similar to support structure 625 discussed above with respect to FIG. 17.

In one aspect of the invention, conveyor 721 having arm-end tooling 801 is adapted to grasp articles 701 or containers 704 and transport them from washer 710 to anywhere downstream of the handling system 700, for example, to position 708 or position 706. In one aspect of the invention, conveyor 722 having arm-end tooling 802 is adapted to grasp articles 701 or containers 704 and transport them from a downstream position, for example, from conveyor 737, to anywhere downstream of the handling system 700, for example, to position 708 or position 706.

According to one aspect of the invention, one or more belt conveyors 707 transport one or more washed articles 701 or containers 704 from first position 708 to a second position 706 on belt conveyor 707. First position 708 may include a container 704, for example, a pallet, for assembling and transporting multiple articles 701 from first position 708 to second position 706 by means of belt conveyor 707. According to one aspect of the invention, container 704 may emerge from washer 710 prior to articles 701 and may be positioned in first position 708 and await placement of articles 701 in position 708. Second position 706 may correspond with a cart, for example, a cart similar to cart 102 described with respect to FIGS. 1, 2, and 3. Belt conveyor 707 may be similar to belt conveyor 107 described with respect to FIGS. 1, 2, and 3 above. As shown in FIG. 18, conveyor 707 may include side rails that assist in preventing the articles 701 or containers 704 carrying the articles 701 from falling off conveyor 707. Conveyors 707 may also include a restraining barrier or stops (not shown) to limit the forward movement of articles 701 or their container 704 when they are transported to second position 706. Second position 706 may also include a lift table 711 for unloading articles 701 or containers 704 from conveyor 707, for example, a lift table similar to lift table 111 shown in and described with respect to FIGS. 1, 2, and 3. The unloading of conveyor 707, for example, by means of lift table 711, may be effected manually or automatically. For example, an operator my actuate lift table 711 by pressing one or more activation buttons (not shown).

As described with respect to conveyor 107 in FIGS. 1, 2, 3, system 700 in FIG. 18 may also have at least one sensor, for example, an optical or electro-magnetic sensor, for detecting the presence of articles 701 or containers 704 in first position 708. The sensors located in first position 708 may be located on one or more sensor support structures (not shown), for example, a structure similar to sensor trees 113 and 115 shown in and described above with respect to FIGS. 1, 2, and 3. As before, the sensor support structures may include one or more sensors, for example, one or more optical or electro-magnetic sensors, adapted or programmed to determine, for example, that bottles are being handled by system 700 or that cage bottoms are being handled by system 700, and accordingly vary the handling procedure. In one aspect of the invention, two sensor support structures containing electro/mechanical actuators positioned opposite each other on either side of first position 708 may be provided. In this aspect of the invention, at least one electro-mechanical actuator may interface with a physical feature set, for example, a recess or projection, on a cart, for example, a UniMac cart, located in second position 708, as discussed above with respect to system 100.

In another aspect of the invention, handling system 700 may include detection devices for detecting the presence of articles 701 or containers 704, electro-mechanical stops or barriers for detaining articles 701 or containers 704 on conveyor 707, and sensors for detecting the presence of subsequent articles 701 or containers 704 on conveyor 707. Position sensors may also be located along conveyor 707 to detect the presence and position of the plurality of articles 701 or containers 704 lined up on conveyor 707. According to one aspect of the invention, a plurality of articles 701 or containers 704, for example, having articles 701, may be lined up on conveyor 707 awaiting subsequent unloading and further processing. In the aspect of the invention shown in FIG. 18, conveyor 707 is shown having a length long enough to accommodate six pallets 704; however, according to aspects of the invention, the length of conveyor 707 and the number of pallets 704 or articles 701 that may be mounted on conveyor 707 may vary broadly, for example, depending on desired queue time or the desired overall length of the room into which system 600 is installed.

In one aspect of the invention, conveyor systems 721 and 722 may comprise multi-axis conveyors. For example, conveyor systems 721 and 722 may comprise double-axis systems, for example, systems that translate articles 701 in the X and Z directions as shown by coordinate axes 760 shown in FIG. 18. In another aspect of the invention, conveyor systems 721 and 722 may be a triple-axis conveyor systems, for example, a systems that translate articles 701 in the X, Y, and Z directions as shown by coordinate axes 760.

According to one aspect of the invention, conveyor systems 721 and 722 in FIG. 18 may includes arm-end tools 801 and 802, respectively, for example, arm-end tool similar to arm-end tool 300 illustrated in FIGS. 4, 5, 6, 7, and 8. In another aspect of the invention, arm-end tools 801, 802 may be identical to the arm-end tool 300, but without stripper assembly 344, that is, without the "cage stripper". According to this aspect of the invention, since the articles 701 assembled on, for example, staging position 742, will typically not be stacked or nested, there will typically be no need provide the "stripping" function provided by stripper assembly 344. However, in one aspect of the invention, arm-end tools 801, 802 may include a stripper assembly 344 for stripping nested articles. In another aspect of the invention, arm-end tools 801, 802 may include at least one gripper assembly 330 shown in FIGS. 4, 5, 6; in another aspect of the invention, gripper assembly 330 may be omitted from arm-end tools 801, 802.

According to one aspect of the invention, the articles 701 and containers 704 may be located in second position 708 by conveyors 721 or conveyor 722. For example, in one aspect of the invention, conveyor 721 may transport a container 704, for example, a cage pallet, from washer 710 to second position 708. According to another aspect of the invention, handling system 700 may also include a lift table 713 located in second position 708, for example, a lift table similar to lift tables 111 and 211, discussed above. In this aspect of the invention, the lift table located in position 708 may be loaded with articles by conveyor 721 or conveyor 722. When loaded as desired, for example, with cages upon a pallet, the lift table 713 in second position 708 may transfer the pallet and cages to conveyor 707 and another pallet may be positioned on lift table 713 in second position 208, and the pallet reloaded. Again, conveyor 707 transfers the articles 701 from second position 708 to third position 706, for example, to lift table 711 and a cart (not shown). After assembly of one or more washed articles 701 on the cart, the cart may be used to transport washed articles 701, for example, manually transported, to storage or other handling.

The aspect of the invention shown in FIG. 18 is a single-line system having single unloading line that unloads a single washer 710. However, aspects of the present invention may comprise multiple lines, that is, two or more lines, for unloading and handling two or more washers 710.

In another aspect of the invention, instead of conveyor system 721 transporting washed articles 701 or containers 704 to first position 708, washed articles 701 or containers 704 may be further handled by unloading system 705. In one aspect of the invention, for example, when articles 701 comprise cage bottoms, system 705 may include a means for inverting articles 701 in preparation for further processing. For example, in one aspect of the invention, articles 701 may be transferred from washer output location 730 to a conveyor 732, for example, a motorized roller conveyor, at an elevation lower than output location 730, for example, at least about 1 inch lower. In this aspect of the invention, the difference in elevation between output location 730 and conveyor 732 causes articles 701 to cascade from output location 730 to conveyor 732 whereby articles 701 are inverted, or "flipped over", for example, so that articles 701 have their open sides directed upward in preparation for further handling. Though this simple method is effective in inverting articles 701 or containers 704, other means may be provided for inverting articles 701 or containers 704.

In another aspect of the invention, for example, when articles 701 comprise cage bottoms, system 720 may further include means for introducing one or more materials, for example, bedding, to articles 701. In the aspect of the invention shown in FIG. 18, bedding may be introduced to articles 701 via an automated bedding dispenser 735. As the articles 701, for example, cage bottoms, are transferred through bedding dispenser 735 by conveyor 732, bedding is introduced to articles 701 and then articles 701 are discharged to conveyor 737, for example, a continuation of conveyor 732 or another motorized roller-type conveyor. According to one aspect of the invention, bedding dispenser 735 may comprise a "rain shower" type bedding dispenser, for example, a bedding dispenser provided by Getinge, or its equivalent.

As noted above, since articles 701 or containers 704 typically are discharged from washer 710 in a haphazard fashion, articles 701 or containers 704 may be arranged on washer output conveyor 730, conveyor 732, or conveyor 737 (after passing through bedding dispenser 735) in a haphazard manner, that is, without any pre-determined order or orientation. According to one aspect of the invention, further handling of articles 701 or containers 704 may be assisted by a means for locating articles 701 or containers 704, grasping them, and positioning them in an orderly fashion for further handling. In one aspect of the invention, the means for locating and handling articles 701 or containers 704 may include an automated locating and handling system, for example, the system 240 shown and described with respect to FIGS. 9, 10, and 11. According to one aspect of the invention, the automated locating and handling system 240 comprises a vision-based locating and handling system, for example, a vision-based locating and handling system having at least one vision or camera system at least one automated conveyor system, and a control system for operating the vision system and coordinating the operation of the handling system 240. The handling system 240 may locate articles 701 or containers 704 on conveyors 730, 732, or 737 or control the conveyor systems 721, 722 to grasp and transport the articles 701 or containers 704 to a predetermined location, for example, to position 708, in an ordered fashion so that they can be readily accessed for further handling. In one aspect of the invention, further handling may comprise transport from first position 708 to adjacent conveyor 707.

According to one aspect of the invention, handling system 100 shown in FIGS. 1, 2, and 3, the handling system 200 shown in FIGS. 9, 10, and 11, and the handling systems 600 and 700 shown in FIGS. 17 and 18 may be operated individually as separate systems associated with their respective automatic washers. However, in another aspect of this invention, handling system 100, handling system 200, and handling systems 600, and 700 may be associated with the same automatic washer or washers, for example, system 100 may feed a washer or washers and system 200 may unload the same washer or washers, or system 600 may feed a washer or washers and system 700 may unload the same washer or washers.

Aspects of the present invention provide improved systems, methods, and devices for handling articles being introduced to and removed from automatic washers, for example, automatic tunnel washers. The articles that may be handled by the present invention include, but are not limited to, cages, cage bottoms or tops, bottles and bottle tops, and containers, such as bottle baskets and pallets.

As will be appreciated by those skilled in the art, features, characteristics, and/or advantages of the systems, methods, and devices described herein, may be applied and/or extended to any embodiment (for example, applied and/or extended to any portion thereof).

Although several aspects of the present invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An automated method of transferring at least one article from a first position to a second position, the method comprising:

locating the at least one article in the first position using a vision-based system;

determining whether the at least one article is misaligned and, when misaligned, ignoring the at least one article; when the at least one article is not misaligned, in response to instructions from the vision-based system, positioning an arm-end tool having a gripping assembly adjacent the at least one article, the arm end tool mounted to a conveyor;

actuating the gripping assembly to grasp the at least one article; and transferring the at least one article from the first position to the second position by means of the conveyor.

2. The method as recited in claim 1, further comprising determining the orientation of the at least one article using the vision-based system.

3. The method as recited in claim 2, further comprising orienting the gripping assembly with the at least one article in response to the orientation determined by the vision-based system.

4. The method as recited in claim 1, wherein the first position comprises a first conveyor, and wherein locating the at least one article in the first position comprises locating the at least one article on the first conveyor.

5. The method as recited in claim 4, wherein the first conveyor comprises a discharge conveyor from a washer, and wherein locating the at least one article on the first conveyor comprises locating the at least one article on the discharge conveyor of the washer.

6. The method as recited in claim 4, wherein ignoring the at least one article comprises conveying the at least one article off of the first conveyor.

7. The method as recited in claim 6, wherein conveying the at least one article comprise allowing the at least one article to fall into a bin.

8. The method as recited in claim 1, wherein the at least one article comprises opposing inner surfaces, and wherein actuating the gripping assembly to grasp the at least one article comprises actuating the gripping assembly and engaging the opposing inner surfaces.

9. The method as recited in claim 1, wherein the at least one article comprises a cage bottom having opposing inner surfaces, and wherein actuating the gripping assembly to grasp the at least one article comprises actuating the gripping assembly and engaging the opposing inner surfaces of the cage bottom.

10. The method as recited in claim 1, wherein the second position comprises a staging position.

11. The method as recited in claim 1, wherein the vision-based system comprises a camera, and wherein locating the at least one article in the first position using the vision-based system comprises locating the at least one article with the camera.

12. The method as recited in claim 1, wherein the method further comprises transferring the at least one article from the second position to a third position.

13. The method as recited in claim 12, wherein the method is practiced in less than 5 seconds.

14. The method as recited in claim 1, wherein the conveyor comprises one of a robot-type conveyor and a gantry-type conveyor.

15. The method as recited in claim 1, wherein the at least one article comprises a container, and wherein the method further comprises filling the at least one container with one of a gas, a liquid, and a solid.

* * * * *

UNITED STATES PATENT AND TRADEMARK OFFICE
CERTIFICATE OF CORRECTION

PATENT NO. : 7,325,667 B1  Page 1 of 1
APPLICATION NO. : 10/962123
DATED : February 5, 2008
INVENTOR(S) : Damick et al.

It is certified that error appears in the above-identified patent and that said Letters Patent is hereby corrected as shown below:

In The Claims:

Col. 34, Line 34, Claim 7: Delete "comprise" and insert -- comprises --

Signed and Sealed this

Seventeenth Day of June, 2008

JON W. DUDAS
*Director of the United States Patent and Trademark Office*